US007796587B2

(12) United States Patent
Norman et al.

(10) Patent No.: US 7,796,587 B2
(45) Date of Patent: *Sep. 14, 2010

(54) METHODS AND APPARATUS FOR STORAGE AND PROCESSING OF ROUTING INFORMATION

(75) Inventors: Richard S. Norman, Sutton (CA); John Haughey, Richford, VT (US)

(73) Assignee: Hyperchip Inc., St. Laurent, Quebec (CA)

( * ) Notice: Subject to any disclaimer, the term of this patent is extended or adjusted under 35 U.S.C. 154(b) by 1030 days.

This patent is subject to a terminal disclaimer.

(21) Appl. No.: 11/361,970

(22) Filed: Feb. 27, 2006

(65) Prior Publication Data

US 2006/0140185 A1    Jun. 29, 2006

(51) Int. Cl.
*H04Q 11/00* (2006.01)
(52) U.S. Cl. .................. 370/378; 370/412; 709/214
(58) Field of Classification Search ......... 370/229–235, 370/389–394, 351–357, 412–429
See application file for complete search history.

(56) References Cited

U.S. PATENT DOCUMENTS

| | | | | |
|---|---|---|---|---|
| 6,078,963 A * | 6/2000 | Civanlar et al. | ............. | 709/238 |
| 6,256,295 B1 * | 7/2001 | Callon | ........................ | 370/254 |
| 6,449,256 B1 * | 9/2002 | Varghese et al. | ............ | 370/238 |
| 6,490,592 B1 * | 12/2002 | St. Denis et al. | ............ | 707/102 |
| 7,054,311 B2 * | 5/2006 | Norman et al. | ............. | 370/378 |

* cited by examiner

*Primary Examiner*—Phuc Tran

(57) ABSTRACT

Methods and apparatus for processing a plurality of sets of routing information received from corresponding ones of a plurality of neighbor nodes connectable to a router, the router having a plurality of memory units accessible via separate paths. The method comprises creating a respective plurality of non-identical routing information subsets from each of at least one of the received sets of routing information; accessing the plurality of memory units via the separate access paths; and storing the plurality of non-identical routing information subsets created from a given one of said received sets of routing information in respective ones of the plurality of memory units. By providing a distributed memory architecture for storing routing information, an increase in a router's memory requirements can be met by increasing the number of memory units.

14 Claims, 17 Drawing Sheets

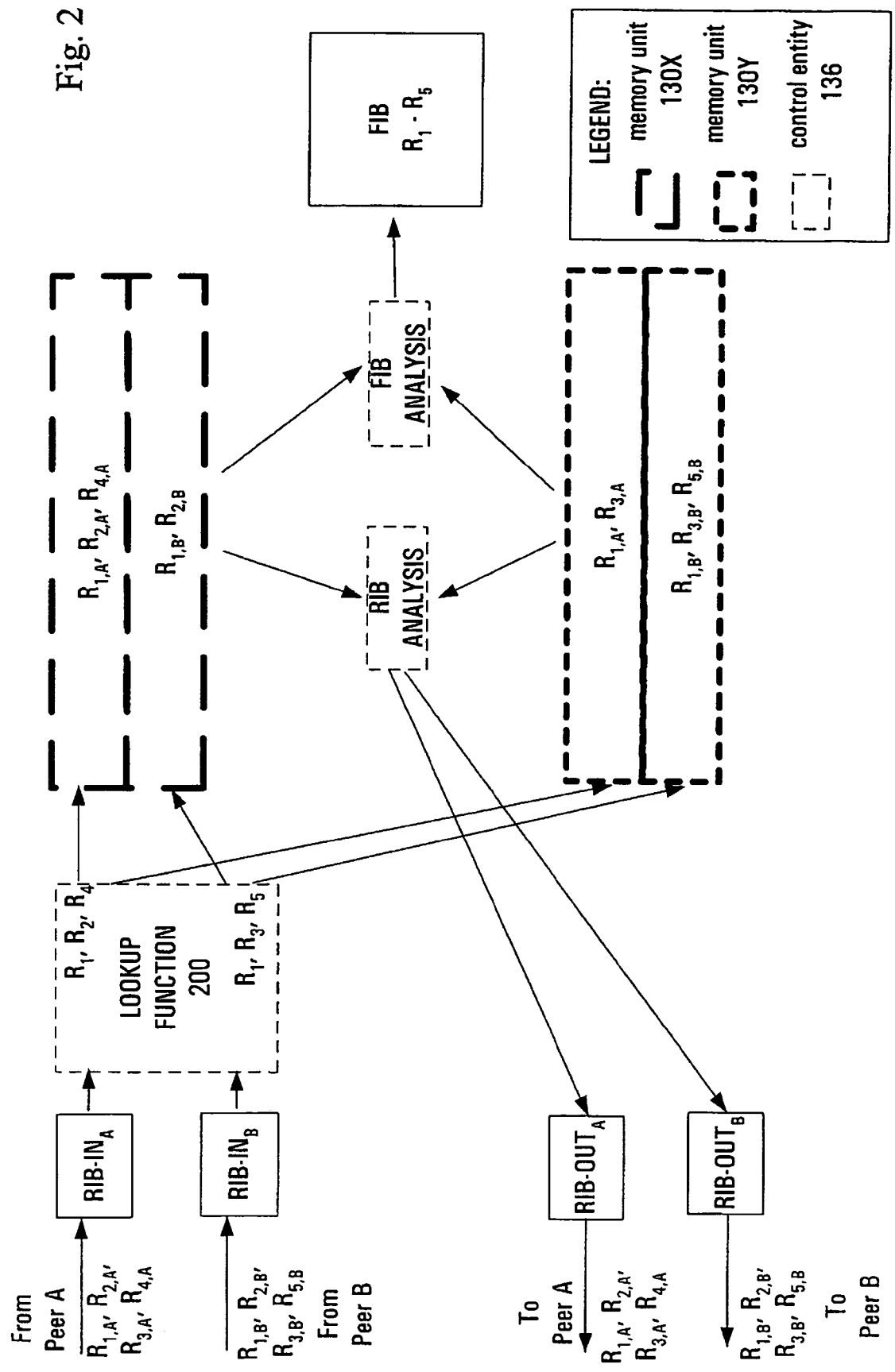

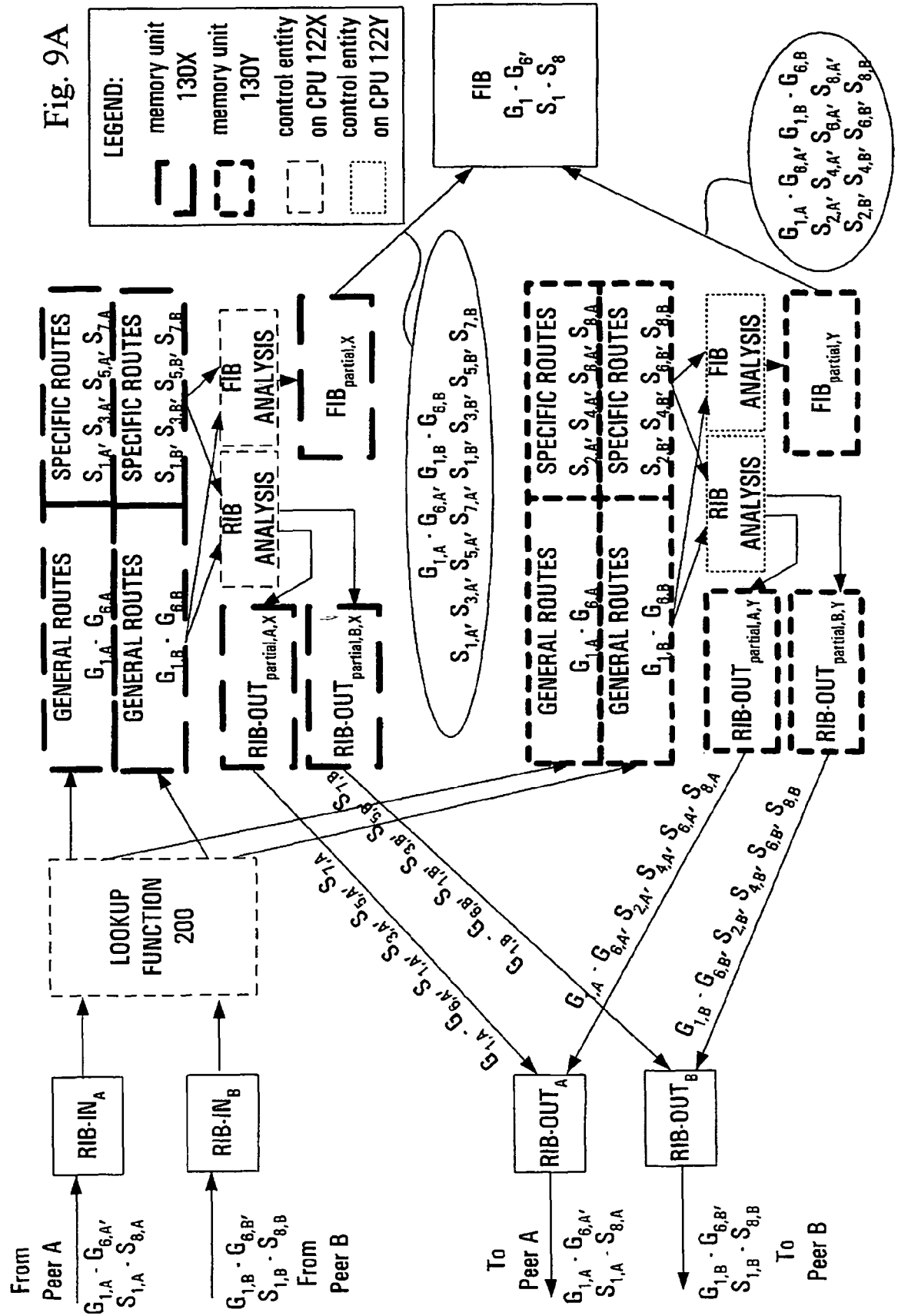

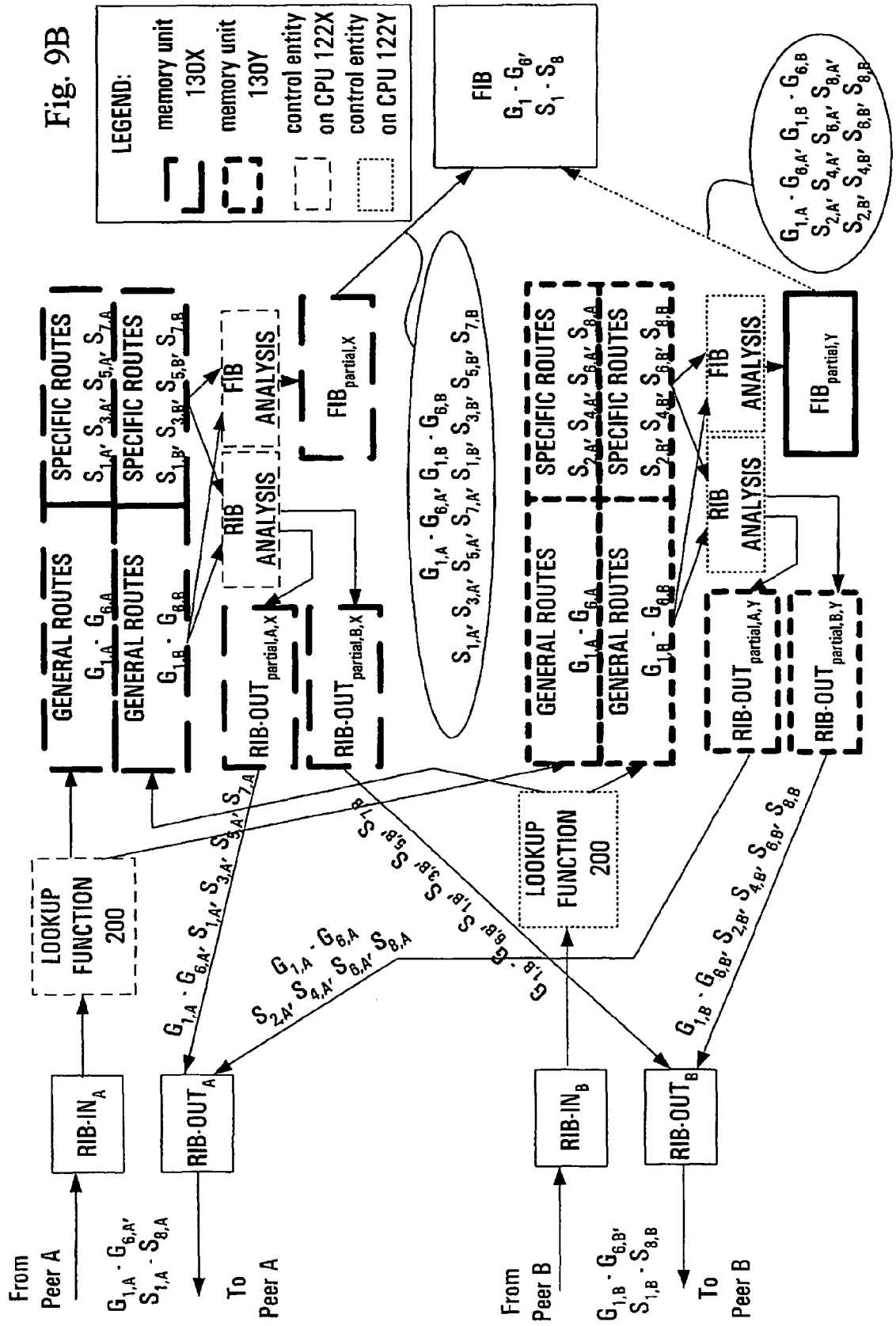

METHODS AND APPARATUS FOR STORAGE AND PROCESSING OF ROUTING INFORMATION

CROSS-REFERENCE TO RELATED APPLICATION

This application claims the benefit under 35 U.S.C. 120 of U.S. patent application Ser. No. 09/916,200 filed on Jul. 27, 2001 by Norman et al. and hereby incorporated by reference herein.

FIELD OF THE INVENTION

The present invention relates to internetworking routers and, more particularly, to the storage, processing and distribution of routing information utilized by such routers.

BACKGROUND OF THE INVENTION

For every node in a network to be able to exchange traffic with every other node, the intermediate nodes between every possible combination of endpoints (i.e., source and destination) must know the direction in which to send traffic so that the traffic can be advanced closer to its destination. In the following, intermediate nodes adapted to decide which path to use for forwarding traffic in this manner are referred to as routers.

It is possible for a router to know of more than one path for reaching a particular destination. For reasons such as choosing the optimal path and choosing a path consistent with administrative or technical policy, it is necessary for a router to analyze the information it receives from various sources and select the path it wishes to use for the particular destination. This decision process is referred to as "routing".

A "routing table" is used by a router to help it make its routing decisions. A routing table inside a router typically includes all the information that the router knows about the topology of the network in terms of links and locations of destinations. A given router's understanding of the topology of the network can come from sources such as static configuration and dynamic routing protocols. Examples of commonly used dynamic routing protocols include both exterior gateway protocols and interior gateway protocols such as border gateway protocol (BGP), open shortest path first (OSPF) and intermediate system to intermediate system (IS-IS), among others.

Based upon the information in the routing table, the router makes decisions about which path to use for each particular destination, thereby resulting in the creation of a forwarding table. When a router subsequently receives a packet on an interface, it looks up the destination address of the packet in the forwarding table and performs a switching operation, causing the packet to emerge at the particular interface specified in the forwarding table. In this way, the router gets the packet closer to its destination. The acts of receiving a packet, performing a lookup in the forwarding table and sending the packet via the appropriate interface are collectively referred to as "forwarding".

It is known that the amount of routing information and the size of a router's routing and forwarding tables increases with the number of interfaces and with the number of possible destination nodes. Given the existing state of memory density and processing speed in the industry, this places a boundary on the number of interfaces that can be supported by the router, depending on the bandwidth of each interface. For instance, the number of high-speed interfaces that can be supported by some of the most advanced routers given the current configuration of the Internet is limited to about 8-16. At a rate of 10 Gbps per interface, this provides an aggregate routing capacity on the order of 160 Gbps.

An aggregate routing capacity of this magnitude may conceivably be sufficient to support a relatively slow expansion of the Internet, as was the case when connectivity was limited to a single backbone (known as NSFNET) and restricted to government, educational and military institutions as well as a handful of Internet service providers (ISPs). In late 1994 and early 1995, the NSFNET backbone was decommissioned and since then, the addition of commercial and private interests to the Internet community has caused the number of reachable computers on the Internet to skyrocket. This, coupled with a steady rise in the average bandwidth of individual connections as end users begin to make more use of graphics-intensive services, has resulted in a dramatic increase in the amount of traffic circulating on the Internet, leading, in turn, to a heightened demand on routers to handle greater aggregate capacities. If the existing trend continues, aggregate capacities far exceeding 160 Gbps and interfaces numbering far more than 16 will be required of the next generation of routers.

Unfortunately, conventional approaches to increasing router capacity and interface density offer merely incremental improvements and do not scale easily when the aggregate routing capacity and number of interfaces needs to be increased by several orders of magnitude. An important factor contributing to this difficulty is the huge amount of routing information received from each of a large number of interfaces. Firstly, the sheer volume of the received routing information and of the associated forwarding tables becomes prohibitively large and thus virtually impossible to store in the memory of a single controller card. Secondly, the time to access and process the received routing information increases to a point beyond which the delay in responsiveness to a topological change in the network becomes unacceptable.

An additional factor contributing to the difficulty of scaling a traditional router is the fact that as the Internet evolves from a best-effort network to one with different classes of service and penalty-based service level agreements (SLAs), each link has increasingly complex cost attributes and the optimal path between destinations may be different for different classes of service. The increasing complexity of the calculations on a per-link basis further compounds the complexity of managing and increasing the number of line cards and interfaces.

Thus, there continues to be a requirement in the industry to provide a router that is scalable to high aggregate capacities and to a large number of interfaces, with the aim of satisfying anticipated increases in the bandwidth demand of the global Internet user community.

SUMMARY OF THE INVENTION

The present invention endeavours to solve one or more of the above problems by providing a distributed memory architecture for storing routing information. In addition, the present invention describes a particular class of algorithms for processing routing information which distributes computational complexity among multiple control entities in the router. The router is thus scalable across orders of magnitude and hence avoids cost hits up front.

According a first broad aspect, the invention seeks to provide a method of processing a plurality of sets of routing information received from corresponding ones of a plurality of neighbor nodes connectable to a router, the router having a plurality of memory units accessible via separate paths. The method comprises creating a respective plurality of non-identical routing information subsets from each of at least one of the received sets of routing information; accessing the plurality of memory units via the separate access paths; and storing the plurality of non-identical routing information subsets created from a given one of said received sets of routing information in respective ones of the plurality of memory units.

According a second broad aspect, the invention seeks to provide an apparatus, comprising: a plurality of memory units accessible via separate paths; a plurality of interfaces for receiving a respective plurality of sets of routing information from corresponding ones of a plurality of neighbor nodes; and a control entity. The control entity is operable for creating a respective plurality of non-identical routing information subsets from each of at least one of the received sets of routing information; accessing the plurality of memory units via the separate access paths; and storing the plurality of non-identical routing information subsets created from a given one of said received sets of routing information in respective ones of the plurality of memory units.

According a third broad aspect, the invention seeks to provide a method of distributing routing information among a plurality of memory units, the routing information pertaining to a plurality of routes, each of the routes having a prefix with a respective length. The method comprises associating each of said routes with a respective subset of said plurality of memory units on a basis of the prefix of that route, the number of memory units in the subset of said plurality of memory units that is associated with a given one of said routes being inversely related to the length of that route's prefix; and causing the routing information pertaining to each of said routes to be stored in each of the at least one of the memory units associated with that route. This third broad aspect is additionally characterized by the routing information pertaining to at least one of said routes not being stored in all of said plurality of memory units.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the drawings:

FIG. 2 is a diagram illustrating creation of output routing information bases and forwarding information bases from distributed routing information by a control entity, in the case where the control entity is not equipped with parallel processing functionality;

FIGS. 9A and 9B are diagrams illustrating creation of output routing information bases and forwarding information bases from distributed routing information by a control entity, in the case where the control entity is equipped with parallel processing functionality;

DETAILED DESCRIPTION OF EMBODIMENTS

Figure 1A:
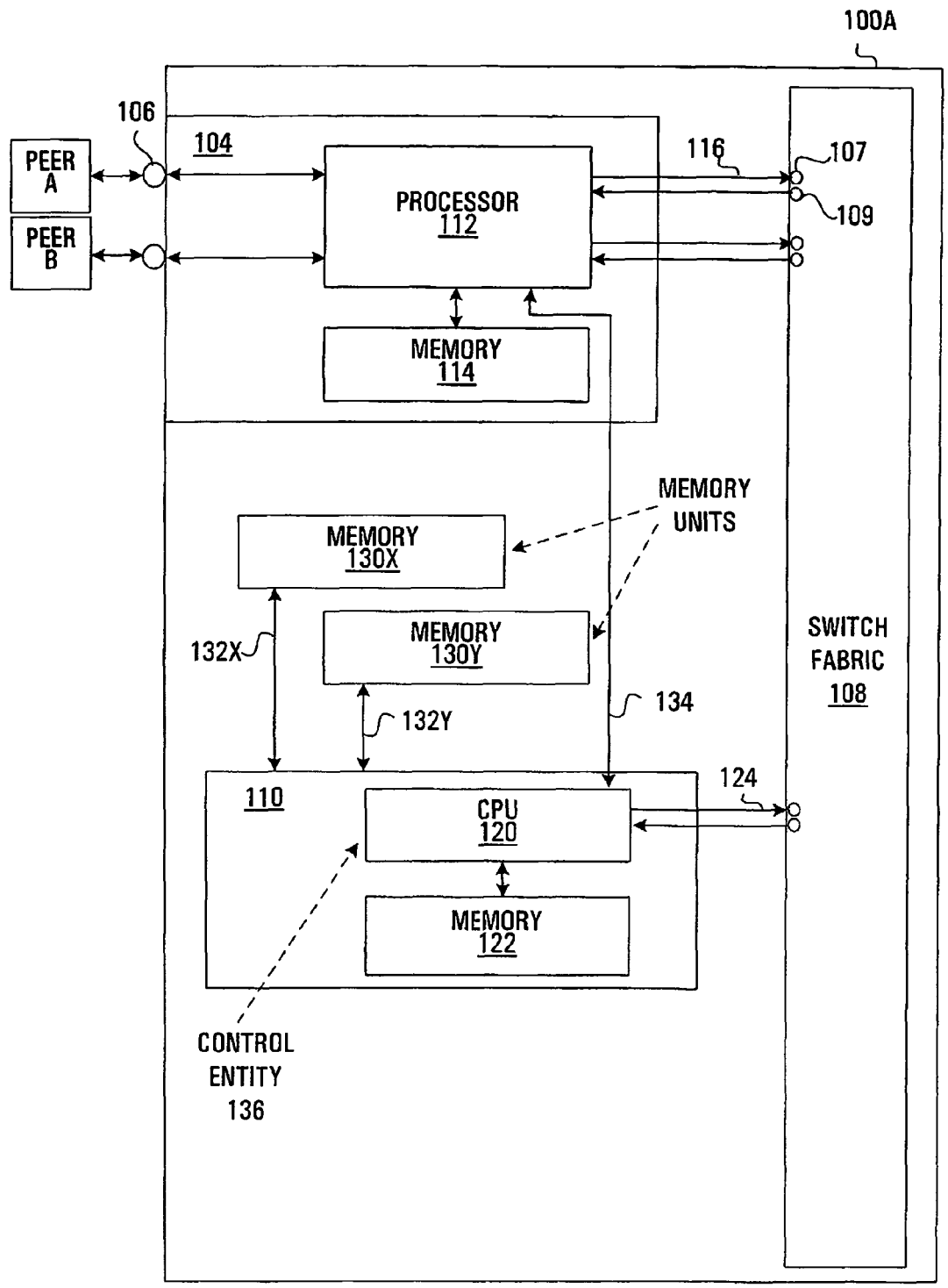
FIG. 1A is a block diagram of a router in accordance with a first embodiment of the present invention.

With reference to FIG. 1A, there is shown a block diagram of a router 100A in accordance with a first embodiment of the present invention. The router 100A communicates with neighbouring nodes, or peers, in a communications network, typically a packet communications network. The present invention is not limited to the number of peers with which the router 100A is capable of communicating.

The router 100A includes a number of line cards 104, only one of which is shown. The line cards 104 may all be located in a single chassis or they may occupy more than one chassis. Each line card 104 interfaces with one or more peers via a corresponding number of input/output interfaces (also referred to as input/output ports) 106, only two of which are shown in FIG. 1A. The present invention is not limited to a specific number of line cards 104 in the router 100A or to a specific number of ports 106 on each line card 104. In the illustrated embodiment, line card 104 has two ports 106 which communicate with peers denoted PEER A and PEER B.

The router 100A further includes a number of controller cards (only one of which is shown at 110). The controller card 110 is also connected to the line card 104 via a control link 134. When many line cards 104 are in use, a bus architecture or a set of dedicated links may be used.

In addition, the router 100A includes a plurality of memory units used for storing routing information. The present invention is not restricted to the number of memory units used for this purpose. In the illustrated embodiment, there are two suitable memory units denoted $130_X$ and $130_Y$. The memory units $130_X$, $130_Y$ are accessed via separate access paths, suitably embodied as separate memory buses. In the illustrated embodiment, the controller card 110 is connected directly to the memory units $130_X$, $130_Y$ via respective control paths $132_X$, $132_Y$. Other implementations shown in FIGS. 1B through 1F are described later on in greater detail.

The line cards communicate with the peers via the ports. In the illustrated embodiment, the line card 104 communicates with PEER A and PEER B via the ports 106. Such communication may involve the setting up or tearing down of a link or virtual circuit. In one specific embodiment, such communication may include signalling in order to establish a link with each peer at the TCP/IP layer.

Furthermore, once a link has been established, the line cards may communicate so-called "traffic packets" with the peers across the established link. In the illustrated embodiment, line card 104 exchanges traffic packets with PEER A and PEER B. A traffic packet entering the router 100A typically includes a header and a payload, where the header identifies a destination of that traffic packet. The destination is typically specified as an address, suitably an Internet Protocol (IP) address of a node in the network, not necessarily one of the peers to which the router 100A is connected.

The line card 104, by which a traffic packet enters the router 100, is responsible for determining by which port (and line card) the traffic packet is to exit the router 100 in order that the packet be advanced closer to its destination. To this end, each line card may be equipped with a circuitry, software or control logic for performing a lookup function 200 on the address of received traffic packets in order to determine the next hop port for each traffic packet. In the illustrated embodiment, the line card 104 includes a lookup mechanism 112 and a memory 114 for this purpose. The lookup mechanism 112 is adapted to consult a "forwarding table" in the memory 114 in an attempt to find a next hop port for the particular destination of each traffic packet received via each of its ports 106. The same forwarding table may be used with two or more line cards.

The lookup mechanism 112 is also adapted to modify each received traffic packet in such a way that it can be routed by a switch fabric 108. In one embodiment, the lookup mechanism 112 may encapsulate the entire traffic packet into the payload of an encapsulated traffic packet, to which it may append a second header holding the identity of the next hop port associated with the traffic packet. The encapsulated traffic packet is send to the switch fabric 108, where routing of the encapsulated packet takes place.

A similar process can be used for setting up links such as virtual circuits (VCs). In such cases the control can be in-band or out-of-band and for persistent links the setup rate can be low enough that a lookup mechanism need not exist within each line card.

The switch fabric 108 has a plurality of input ports 107 and a plurality of output ports 109. In the illustrated embodiment, two input ports 107 and two output ports 109 of the switch fabric are connected to the line card 104 via a plurality of data links 116, in order to allow the exchange of traffic packets between the line card 104 and the switch fabric 108. In addition, the switch fabric 108 is connected to the controller card 110 via a plurality of control links 124.

The switch fabric 108 can be a self-routing switch fabric, that is, it may be adapted to send each encapsulated traffic packet to the port specified in the encapsulated packet's header. In one embodiment, the switch fabric 108 may be an ASIC-based switch fabric, for example, as described in the following U.S. Patent Applications, each to Richard Norman et al., filed on Jun. 1, 2001, assigned to the assignee of the present invention and hereby incorporated by reference herein: Ser. No. 09/870,703, Ser. No. 09/870,766, Ser. No. 09/870,767, Ser. No. 09/870,800 and Ser. No. 09/870,841.

Those skilled in the art will appreciate that the processor 112 in the line card 104 may further include circuitry, software or control logic for providing traffic management functionality in order to assist in balancing the load across the switch fabric 108.

Creation of the forwarding table, also known as a forwarding information base (FIB) is now described. Specifically, the controller card 110 creates the FIB by running a FIB analysis routine on routing information received from the peers. The resultant FIB can be written into the memory 114 via the control link 134 and the lookup mechanism 112, for example. Routing information may be obtained by way of participating in routing protocols. Examples of commonly used routing protocols suitable for use with the present invention include border gateway protocol (BGP), open shortest path first (OSPF) and intermediate system to intermediate system (IS-IS), among others.

In the following, BGP will be used as an example routing protocol but it should be understood that the present invention is equally applicable to other routing protocols. Moreover, BGP will be discussed at a conceptual level, since the details of BGP will be known to a person of ordinary skill in the art. In the particular case of version 4 of BGP, known as "BGP4", further information can be found in the book entitled "BGP4: inter-domain routing in the Internet", by John W. Stewart, III, © 1999 by Addison-Wesley, hereby incorporated by reference in its entirety.

The routing information may arrive at the line card 104 via the same ports 106 as do traffic packets. While the processor 112 in the line card 104 is responsible for processing the received traffic packets, it is the controller card 110 which is responsible for processing the routing information. To this end, the processor 112 is adapted to forward the routing information to the controller card 110 via the control link 134.

The controller card 110 then uses the received routing information to construct the FIB by running a FIB analysis routine. In addition, the controller card 110 uses the received routing information to construct output routing information bases which are reciprocally distributed to the peers as routing information. These functions, which are described in greater detail herein below, are performed by a control entity 136 which, in FIG. 1A, is embodied as a CPU 120. The CPU 120 is also responsible for performing such functions as fault management, system security and user interface management. The controller card 110 also includes a memory 122 for temporarily storing the routing information received from PEER A and PEER B via the line card 104 and the control link 134.

The CPU 120 in the controller card 110 is designed to support an operating environment that has elements of a real-time operating system, as now described with additional reference to FIG. 2. Specifically, the CPU 120 runs various foreground and background tasks. Some of these tasks may involve running separate BGP sessions with the various peers to which the router 100A is connected via the ports 106 and the line card 104. For most of the time, a particular BGP session with a given peer might require no more of the CPU 120 than to exchange so-called "KEEPALIVE" messages with the given peer; such messages, as their name implies, serve to keep the particular BGP session running.

On occasion, however, background or foreground operation of the CPU 120 may be interrupted by receipt of a so-called "UPDATE" message from a particular peer. The UPDATE message is indicative of the fact that the particular peer is sending new routing information to the router 100A. An interrupt may be received by the CPU 120 via the control link 134 to indicate that a particular peer is sending an UPDATE message. The CPU 120 in the controller card 110 is adapted to react to such an interrupt by accepting/acknowledging the UPDATE message from the peer in question.

The UPDATE message received from a particular peer includes routing information sent by that peer. Such routing information is representative of the "network layer reachability" of the particular peer. Specifically, the routing information may in some cases specify a set of "prefixes" that are no longer reachable by the peer in question, as well as a set of prefixes that are reachable by that peer.

In the case of a prefix that is reachable, the routing information may also specify one or more "attributes" associated with that prefix. An example of an attribute associated with a given prefix is the identity of the various autonomous systems which have been traversed by that piece of routing information, starting with an autonomous system directly connected to the autonomous system identified by that prefix.

It should be mentioned that prefix is portion of an IP (Internet Protocol) address that uniquely identifies an autonomous system in the global Internet. A prefix is also sometimes referred to in the art as a "route". As is known in the art of classless inter-domain routing, the length of a prefix might not be a multiple of 8 bits and thus a bit-mask is provided for identifying the true value of a prefix within a multi-octet word.

Since the routing updates depend on the number of ports, and not on the port speed, and the number of unique route paths scales less than linearly with the number of ports, distributing memory and processing becomes increasingly practical for large high-speed routers. While having a separate control plane fabric is desirable for low speeds and practical for low port counts, in large fast systems it thus becomes practical to distribute these resources throughout the router and even for these distributed resources to communicate through in-band signalling.

Accordingly, FIG. 2 illustrates one possible way in which the present invention can provide for distribution of routing information received in sets from a plurality of peers by a router having a plurality of memory units, each adapted to store a subset of each set of routing information. Such a router is suitably embodied by any of the routers 100A through 100F in FIGS. 1A through 1F, respectively. By way of example, a single received set of routing information may form part of an UPDATE message in the context of BGP4.

In this case, only two peers are considered, namely PEER A and PEER B. However, it should be understood that the present invention applies to any number of peers and in fact may provide advantages when the number of peers greatly exceeds two. Also, it is assumed that PEER A supplies the set of routes $R_1$, $R_2$, $R_3$ and $R_4$ and that PEER B supplies the set of routes $R_1$, $R_2$, $R_3$ and $R_5$. Since each route may be associated with an attribute (such as cost) that depends on the peer from which it was received, each route is subscripted according to the peer from which it originates.

Furthermore, it should be noted in FIG. 2 that for illustrative purposes, processing functions and memory usage appear alongside one another. Processing functions executed by the control entity 136 running on the CPU 120 are denoted by rectangles formed by a thin dashed contour, while memory usage within memory unit $130_X$ is denoted by rectangles formed by a thick dashed contour and memory usage within memory unit $130_Y$ is denoted by rectangles formed by a thick dotted contour. Of course, it should be understood that the use of a greater number of memory units is within the scope of the present invention.

Firstly, the set of routes received by the CPU 120 from a given peer are temporarily stored in the memory 122 in what may be referred to as an input routing information base (RIB-IN). The RIB-IN for PEER A is denoted $RIB-IN_A$ and the RIB-IN for PEER B is denoted $RIB-IN_B$. Hence, routes $R_{1,A}$, $R_{2,A}$, $R_{3,A}$ and $R_{4,A}$ are stored in $RIB-IN_A$ and routes $R_{1,B}$, $R_{2,B}$, $R_{3,B}$ and $R_{5,B}$ are stored in $RIB-IN_B$.

Next, the control entity 136, which is running on the CPU 120, executes a lookup function 200 to determine in which one(s) of the memory units $130_X$, $130_Y$ to store each individual route in each RIB-IN. The lookup function 200 separates the routes in the set of routes into two or more subsets of routes, one for each of the two memory units $130_X$, $130_Y$. In the illustrated embodiment, a route can be stored in memory unit $130_X$ or memory unit $130_Y$ or both. In embodiments where there is a greater number of memory units available for participating in the storage of routes, a route may be stored in any number of the available memory units.

The exact distribution of the routes is controllable by selecting a desired lookup function 200. For example, it is within the scope of the invention for routes to be sent to one memory unit or both memory units, depending on any suitable variable, such as a degree of congestion, a time of day or a pre-defined per-route distribution. It is also within the scope of the present invention to group the routes in accordance with their specificity; in fact, such a grouping can lead to additional benefits in terms of parallelism and is discussed in its own right later on.

It should be appreciated that myriad ways of performing the lookup function 200 are within the scope of the present invention. For example, the lookup function 200 may be performed in hardware by way of a hard-coded lookup table or by executing a hashing function (this latter method shall be described in greater detail later on). This provides a fast and direct way of obtaining the identity of one or more memory units into which the route is to be stored. On the other hand, a slower yet more flexible approach involves consulting a lookup table in software.

Upon running the lookup function 200 on each set of routes received from each peer, it will eventually be the case that the memory unit $130_X$ will contain a certain subset of each set of routes for each peer and memory unit $130_Y$ will contain a different subset of each set of routes for each peer. Assume for the purposes of this example that the lookup function 200 operates on the basis that routes $R_1$, $R_2$ and $R_4$ are sent to memory unit $130_X$ and routes $R_1$, $R_3$ and $R_5$ are sent to memory unit $130_Y$. In this case, memory unit $130_X$ contains routes $R_{1,A}$, $R_{2,A}$ and $R_{4,A}$ from PEER A and routes $R_{1,B}$ and $R_{2,B}$ from PEER B, while memory unit $130_Y$ holds routes $R_{1,A}$ and $R_{3,A}$ from PEER A and routes $R_{1,B}$, $R_{3,B}$ and $R_{5,B}$ from PEER B.

Because the router 100A can learn about the same route through multiple neighbour nodes, the control entity 136 needs to initiate a process to analyze all the routes in all of the memory units in order to determine (1) what routing information it will advertise to its peers and (2) what the effect of the routing information is on the forwarding information base. The latter function may be referred to as a FIB analysis and the former as a RIB analysis.

Thus, with continuing reference to FIG. 2, the control entity 136 runs a RIB analysis on the routes stored in memory units $130_X$, $130_Y$ in order to decide which reachability information to advertise to PEER A and PEER B. Various known algorithms can be used for this purpose. It is possible that different reachability information will need to be advertised to each of the peers, depending on various administrative and technical policies implemented in the router 100A. This results in the creation of two output routing information bases (RIB-OUTs), one for each peer.

The control entity 136 also runs a FIB analysis on the routes stored in memory units $130_X$, $130_Y$ in order to create a FIB which is sent to the line card 104 for storage in the memory 114. Various known algorithms can be used for this purpose. When more than one line card is used, the FIB is caused to be stored in the memory of each line card.

The control entity 136 subsequently advertises the contents of each RIB-OUT to the associated peer. The routing information is advertised to a given peer by sending an UPDATE message to that peer via the associated port 106 and line card 104. Having advertised routing information to each of its peers, the CPU 120 returns to its usual foreground and background tasks which had been interrupted upon receipt of an UPDATE message.

In the embodiment illustrated in FIG. 1A, the two memory units $130_X$, $130_Y$ are stand-alone entities accessible by the control entity 136 via separate control links $132_X$, $132_Y$, respectively. Also, the CPU 122 in the controller card 110 is connected directly to the line card 104 via a control link 134. However, it should be appreciated that many variations are within the scope of the present invention. FIGS. 1B through 1F show example variation of the embodiment of FIG. 1A, in which different connectivity scenarios are illustrated. The CPU 120 in controller card 110 is used as one possible structure for implementing the control entity 136 for each of the embodiments illustrated in FIGS. 1B-1F.

Figure 1B:
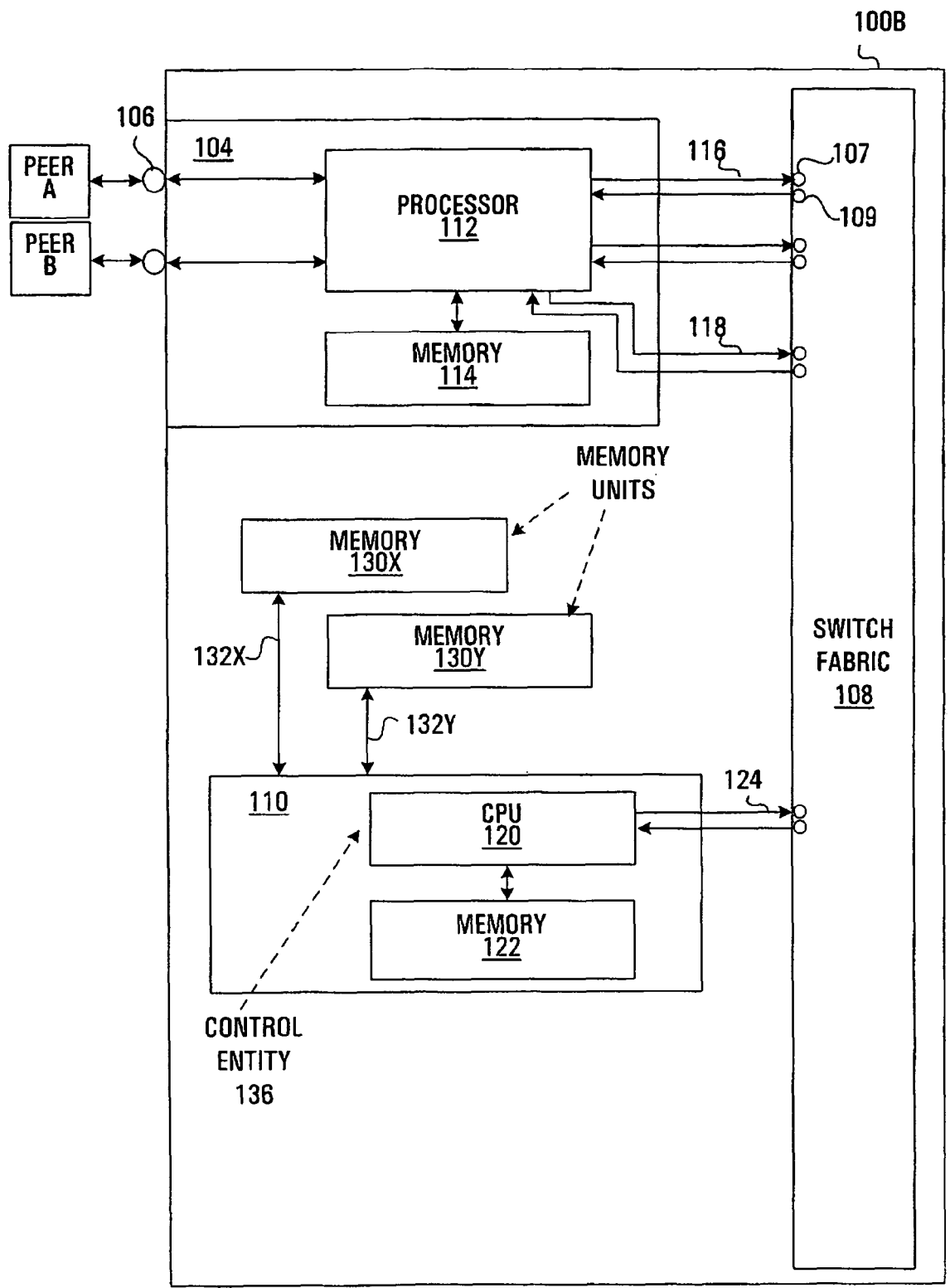
FIGS. 1B to 1F are block diagrams of a router in accordance with variations of the embodiment of FIG. 1.

Specifically, in FIG. 1B, the controller card 110 continues to have direct access to the memory units $130_X$, $130_Y$ via the control links $132_X$, $132_Y$, respectively. However, instead of the CPU 122 being directly connected to the processor 112, the CPU 122 is connected to the processor 112 via the switch fabric 108. Specifically, the CPU 122 is connected to the switch fabric 108 via the control links 124, while the processor 112 is connected to the switch fabric 108 via a dedicated set of control links 118. A bidirectional control link may be used if the ports 107, 109 of the switch fabric 108 have a bidirectional capability. If the processor 112 and the CPU 122 are adapted to exchange control packets with one another that resemble encapsulated traffic packets, then the switch fabric 108 can serve a dual purpose, namely one of switch encapsulated traffic packets and switching control packets.

Figure 1C:
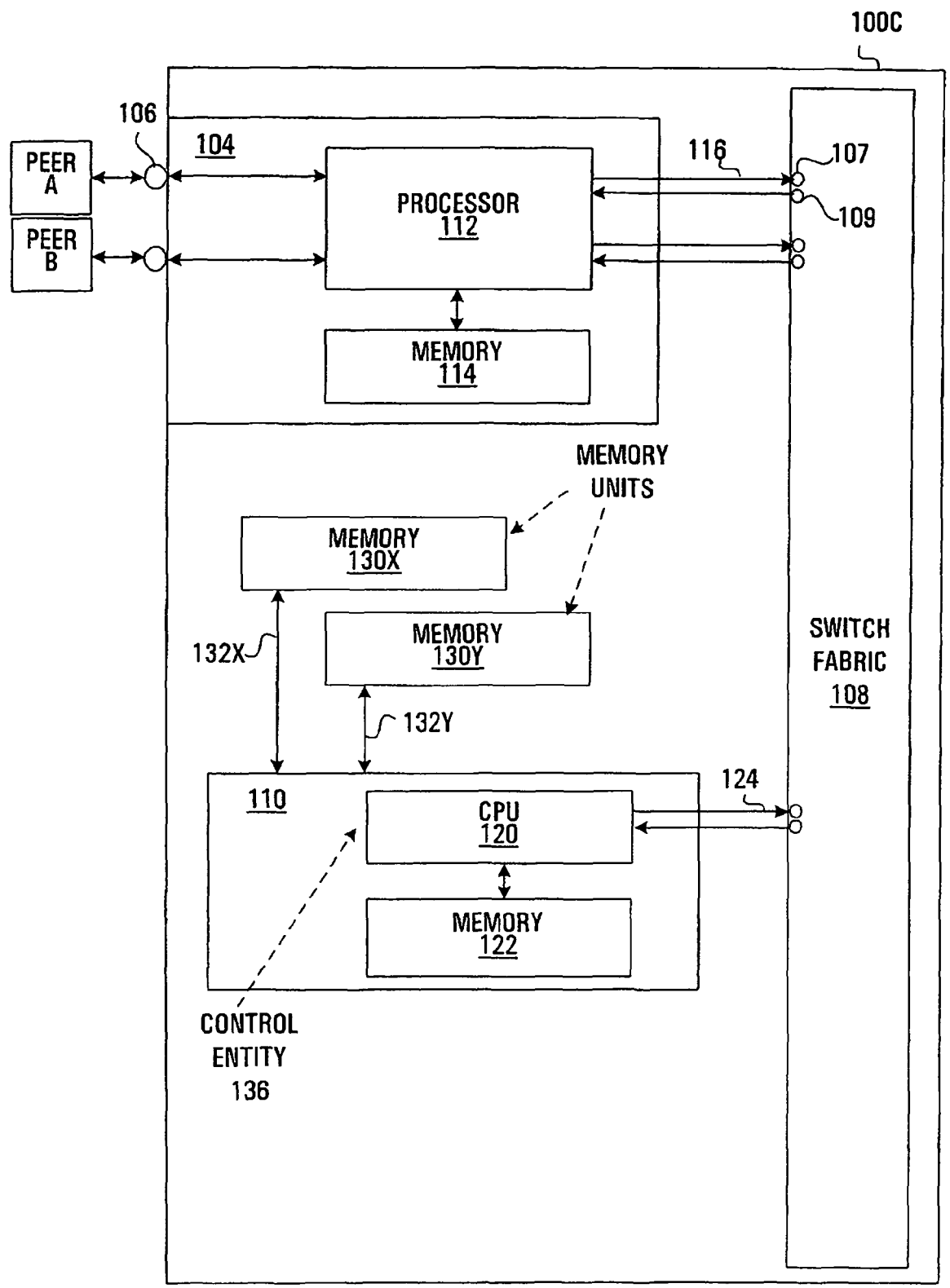

FIG. 1C shows another variation, in which the control links 118 of FIG. 1B have been dispensed with. This is possible if the data links 116 are used as hybrid lines for transmitting encapsulated traffic packets as well as control packets.

Figure 1D:
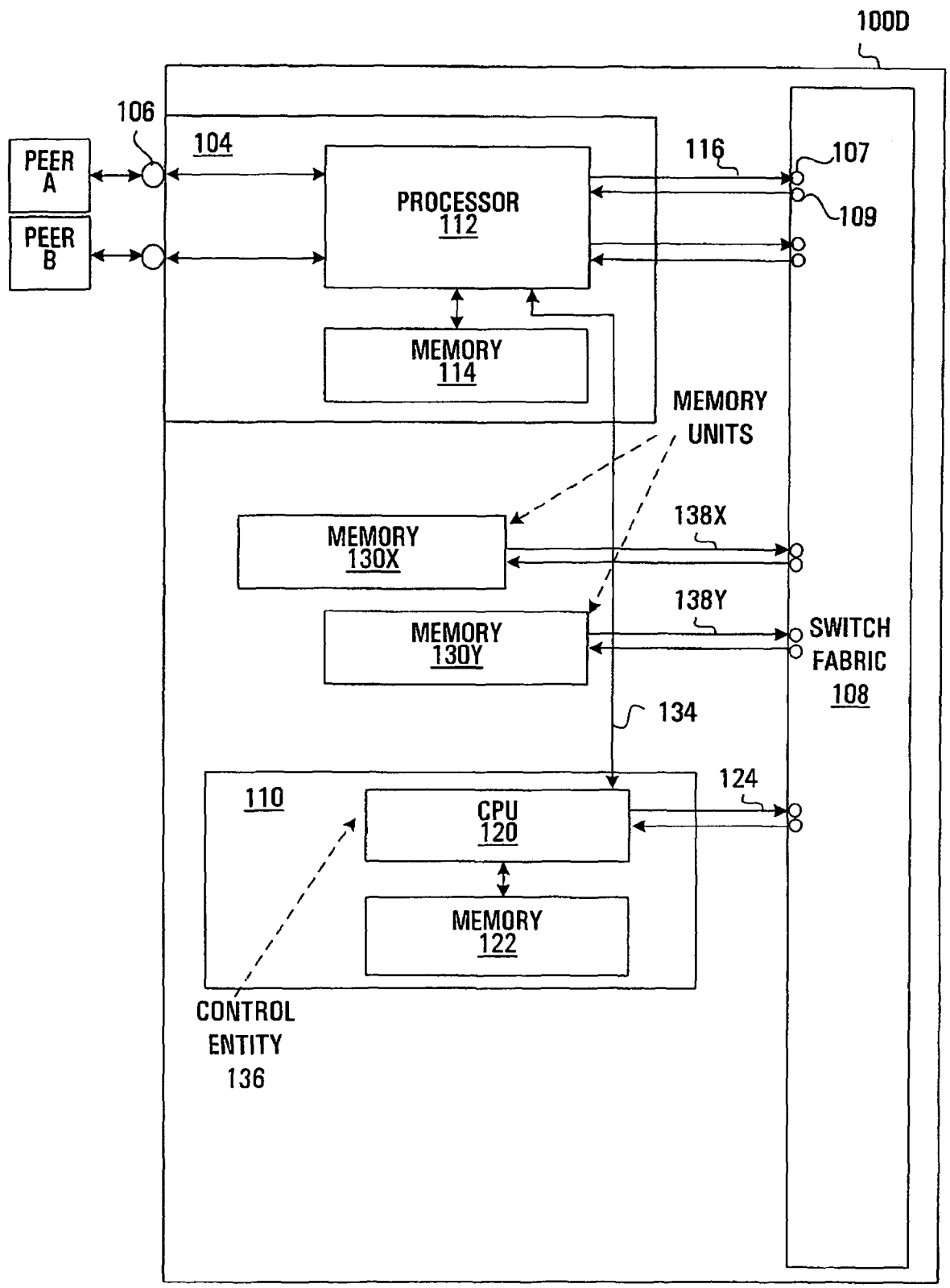
Figure 1E:
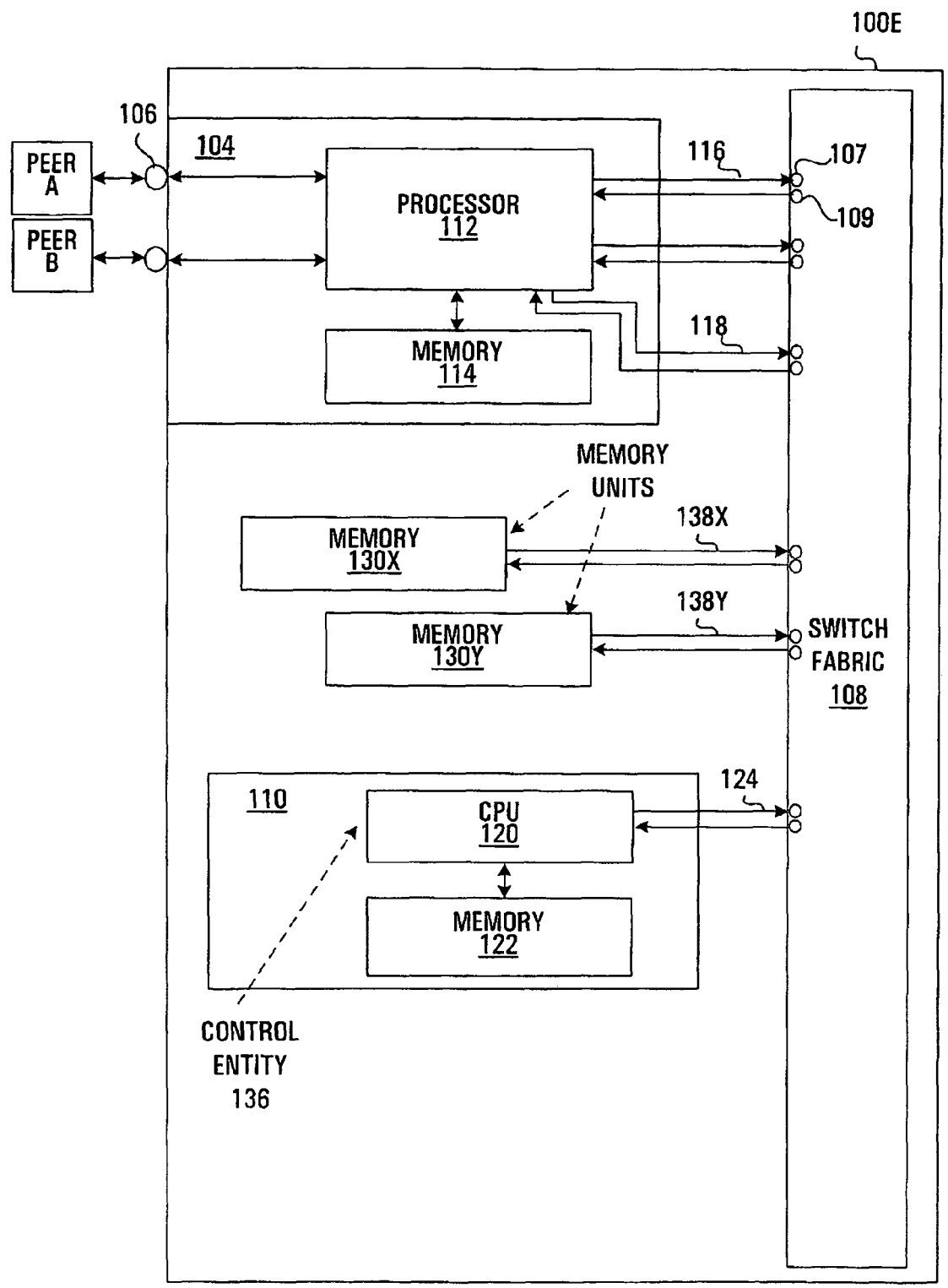
Figure 1F:
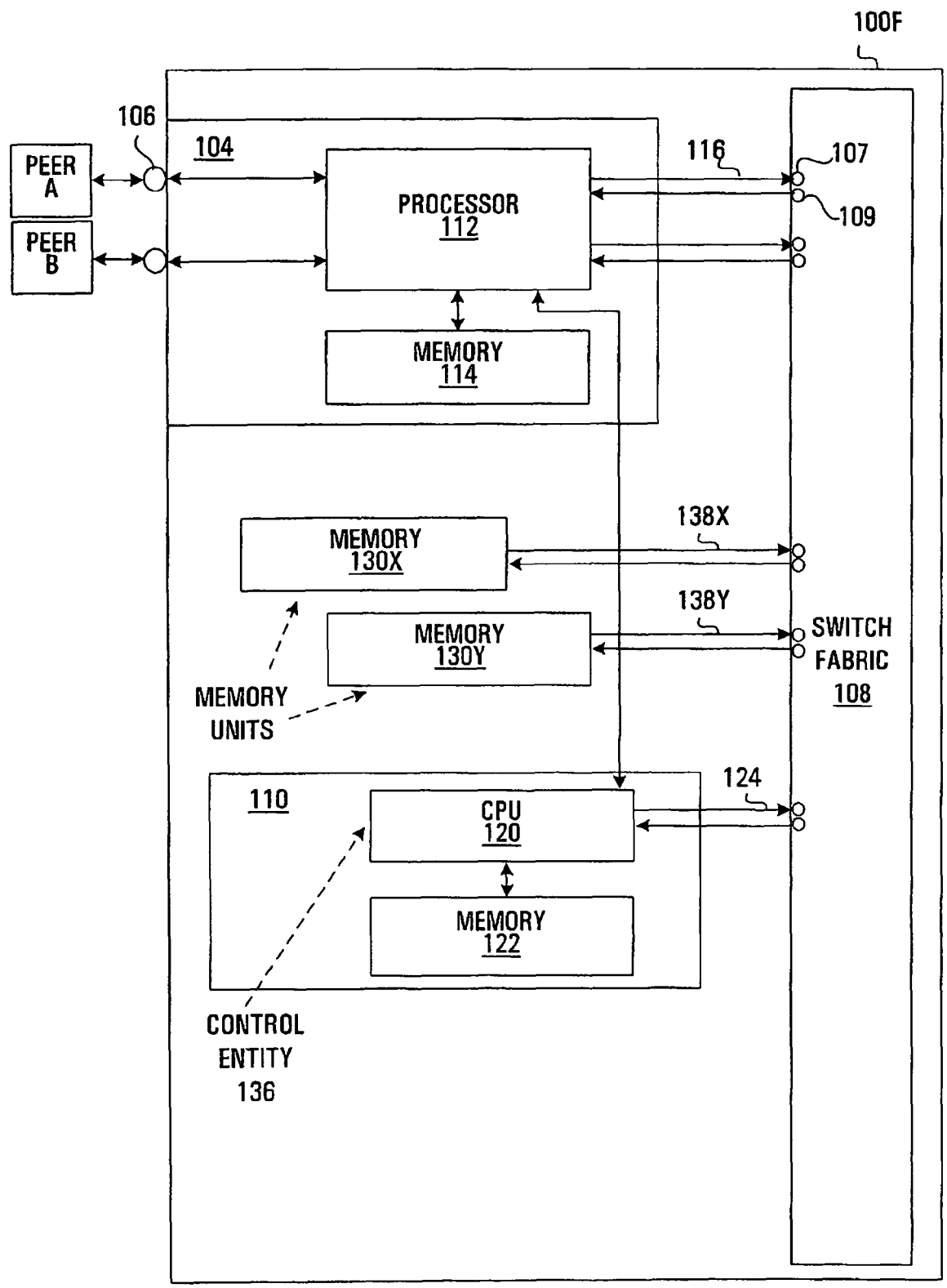

FIGS. 1D through 1F are identical to FIGS. 1A through 1C, except that the controller card 110 is no longer connected directly to the memory units $130_X$, $130_Y$. Rather, the memory units $130_X$, $130_Y$ are connected to ports of the switch fabric via respective control links (or sets of control links) $138_X$, $138_Y$, such that the controller card 110 is connected to the memory units $130_X$, $130_Y$ via the switch fabric 108.

Although two memory units $130_X$, $130_Y$ are used in the examples described herein, it should be understood that the use of more than two memory units is within the scope of the present invention. Moreover, those skilled in the art will appreciate that there are many ways to distribute the memory units $130_X$, $130_Y$ within the router. FIGS. 3-7 illustrate examples of distribution of the memory units $130_X$, $130_Y$ in accordance with other embodiments of the present invention. The CPU 120 in controller card 110 continues to represent one option for implementing the control entity 136 for each of the embodiments illustrated in FIGS. 3-7.

Figure 3:
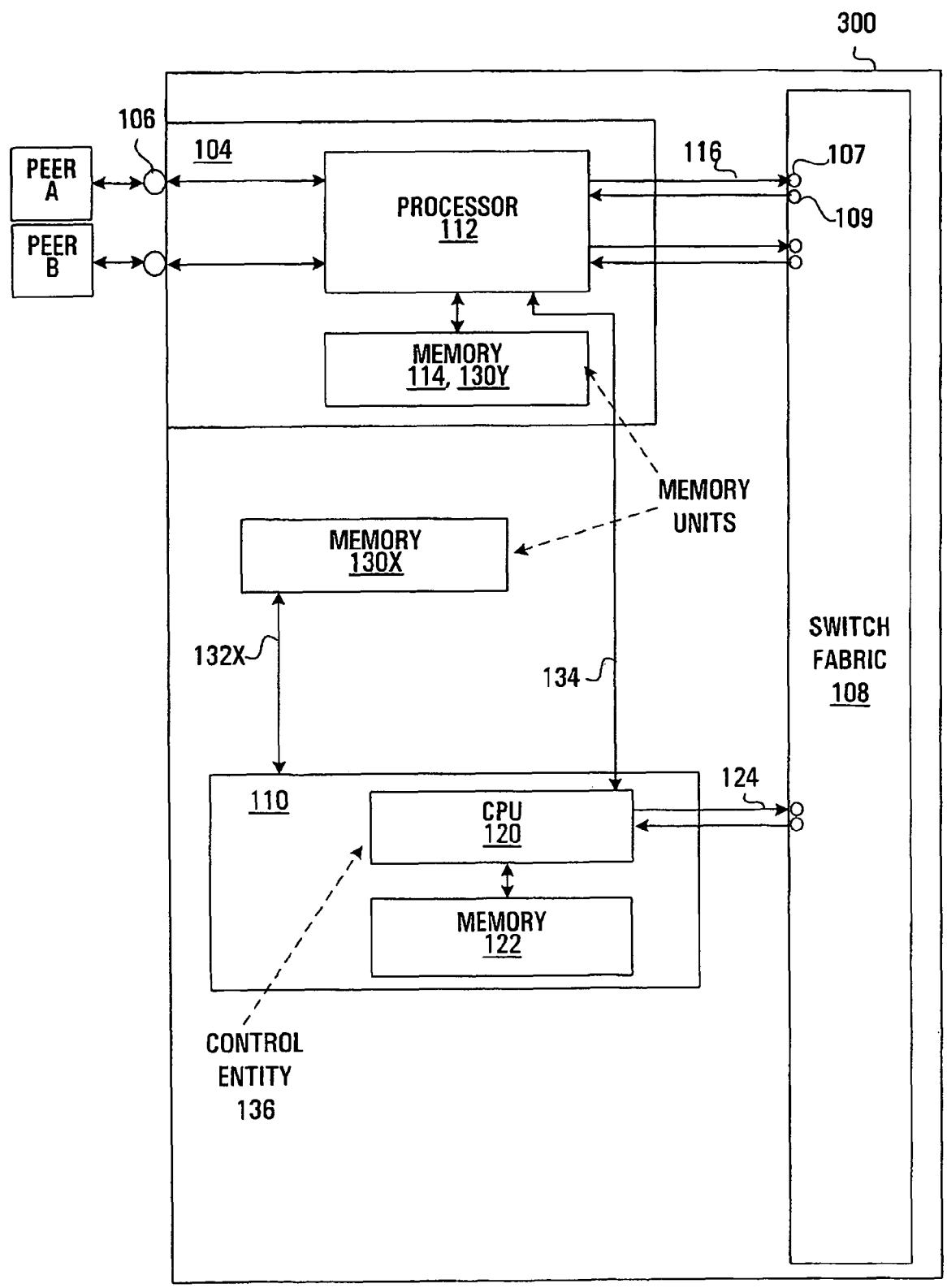
FIGS. 3 to 8 are block diagrams of a router in accordance with other embodiments of the present invention.

Specifically, in FIG. 3, there is shown a router 300 wherein memory unit $130_X$ is embodied as a dedicated memory unit, while memory unit $130_Y$ is embodied as the memory 114 on the line card 104.

Figure 4:
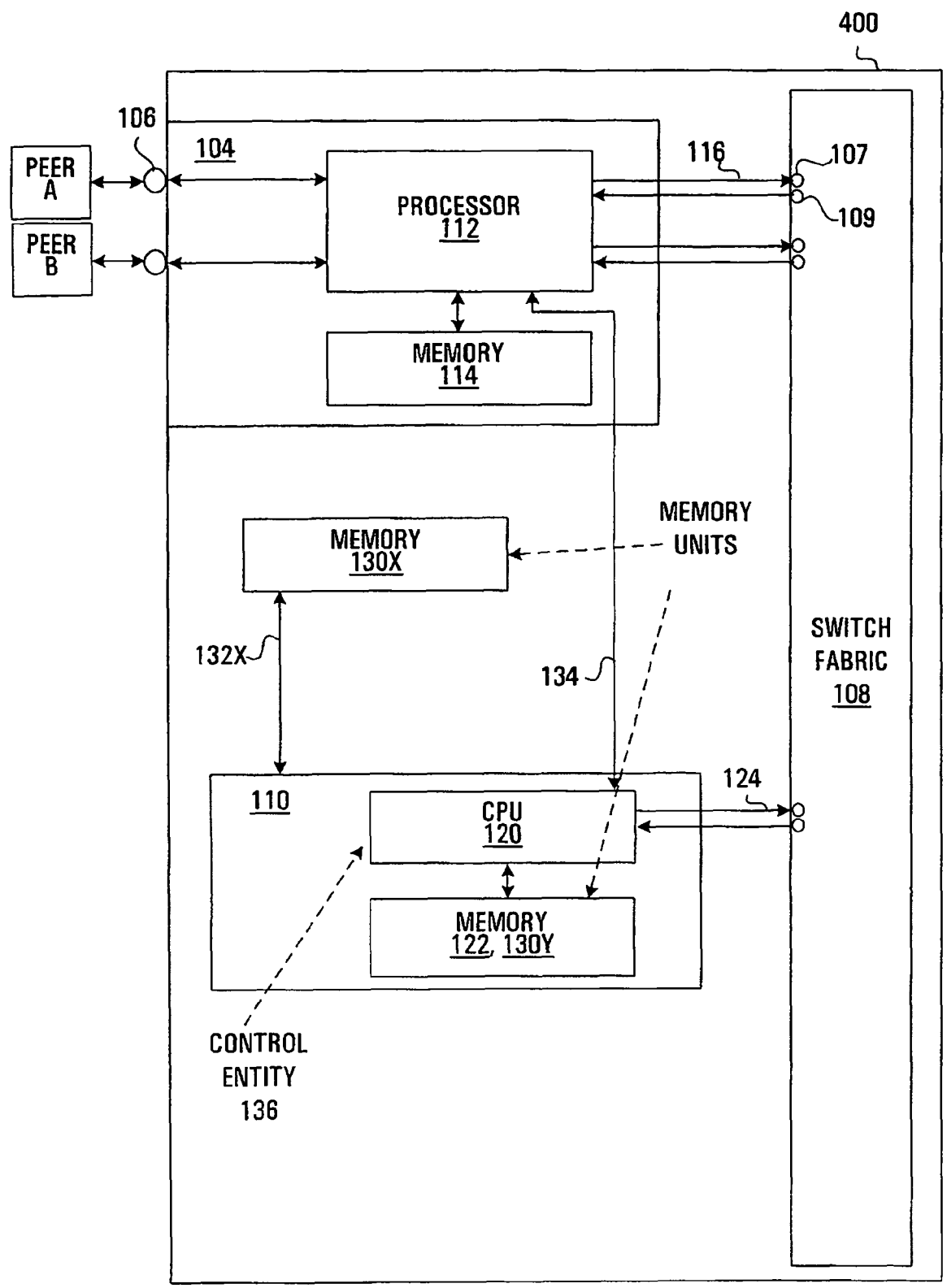

FIG. 4 depicts a router 400 wherein memory unit $130_X$ is embodied as a dedicated memory unit, while memory unit $130_Y$ is embodied as the memory 122 on the controller card 110.

Figure 5:
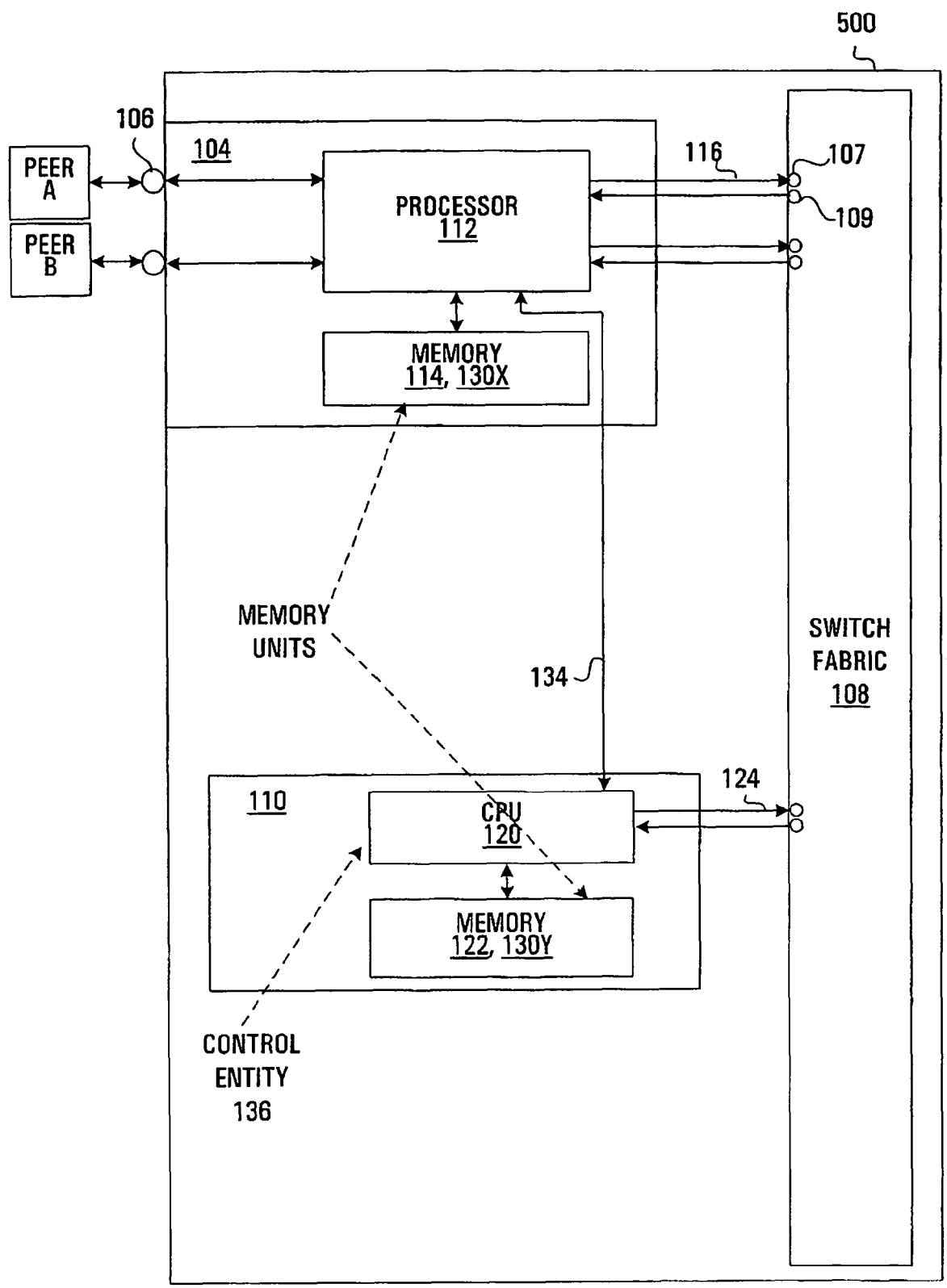

In FIG. 5, there is shown a router 500 wherein memory unit $130_X$ is embodied as the memory 114 on the line card 104, while memory unit $130_Y$ is embodied as the memory 122 on the controller card 110.

Figure 6:
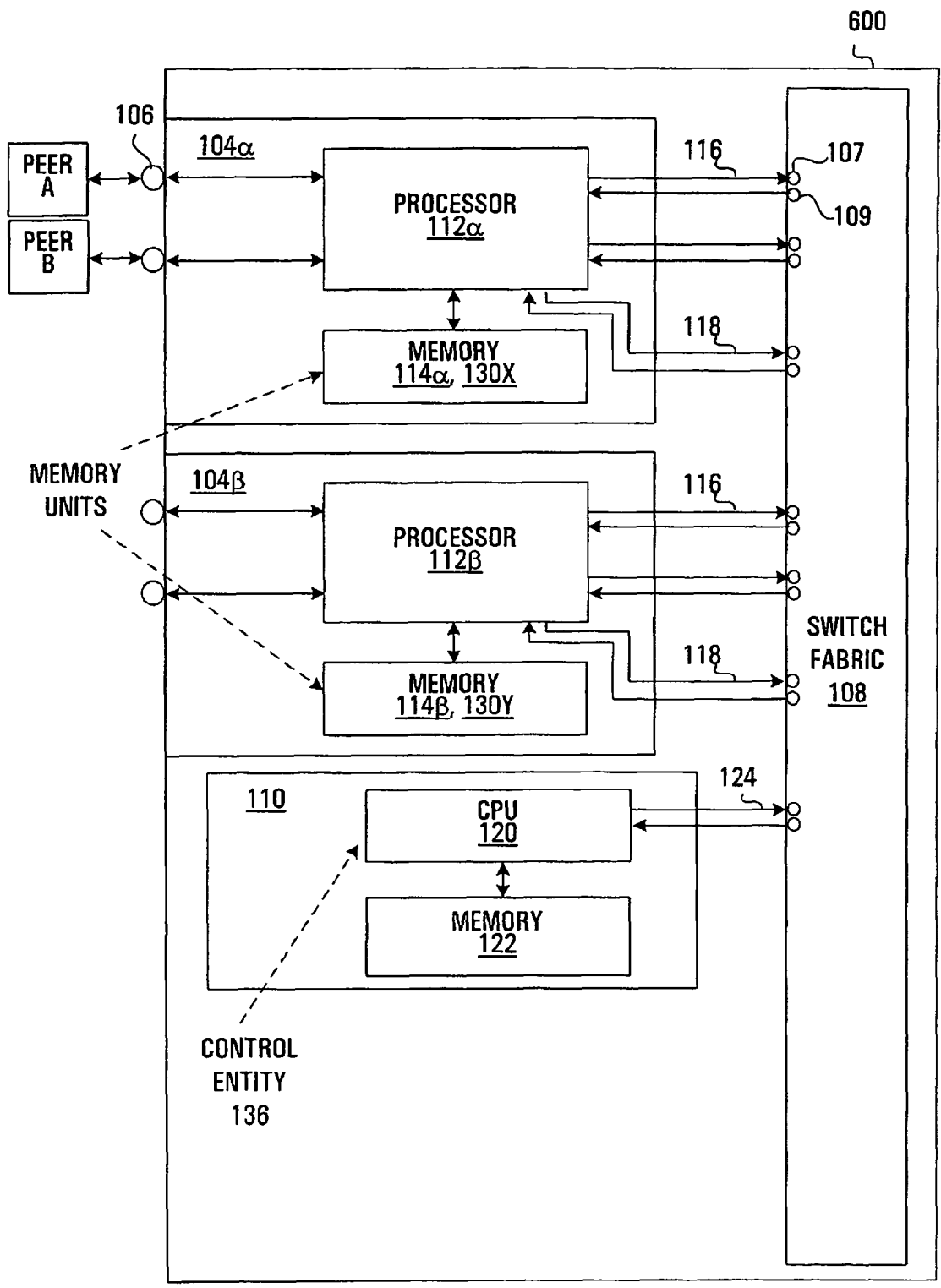

FIG. 6 shows a router 600 with two line cards $104_\alpha$, $104_\beta$, each having a respective processor $112_\alpha$, $112_\beta$ and a respective memory $114_\alpha$, $114_\beta$. In this case, memory unit $130_X$ is embodied as the memory $114_\alpha$ on line card $104_\alpha$, while memory unit $130_Y$ is embodied as the memory $114_\beta$ on line card $104_\beta$.

Figure 7:
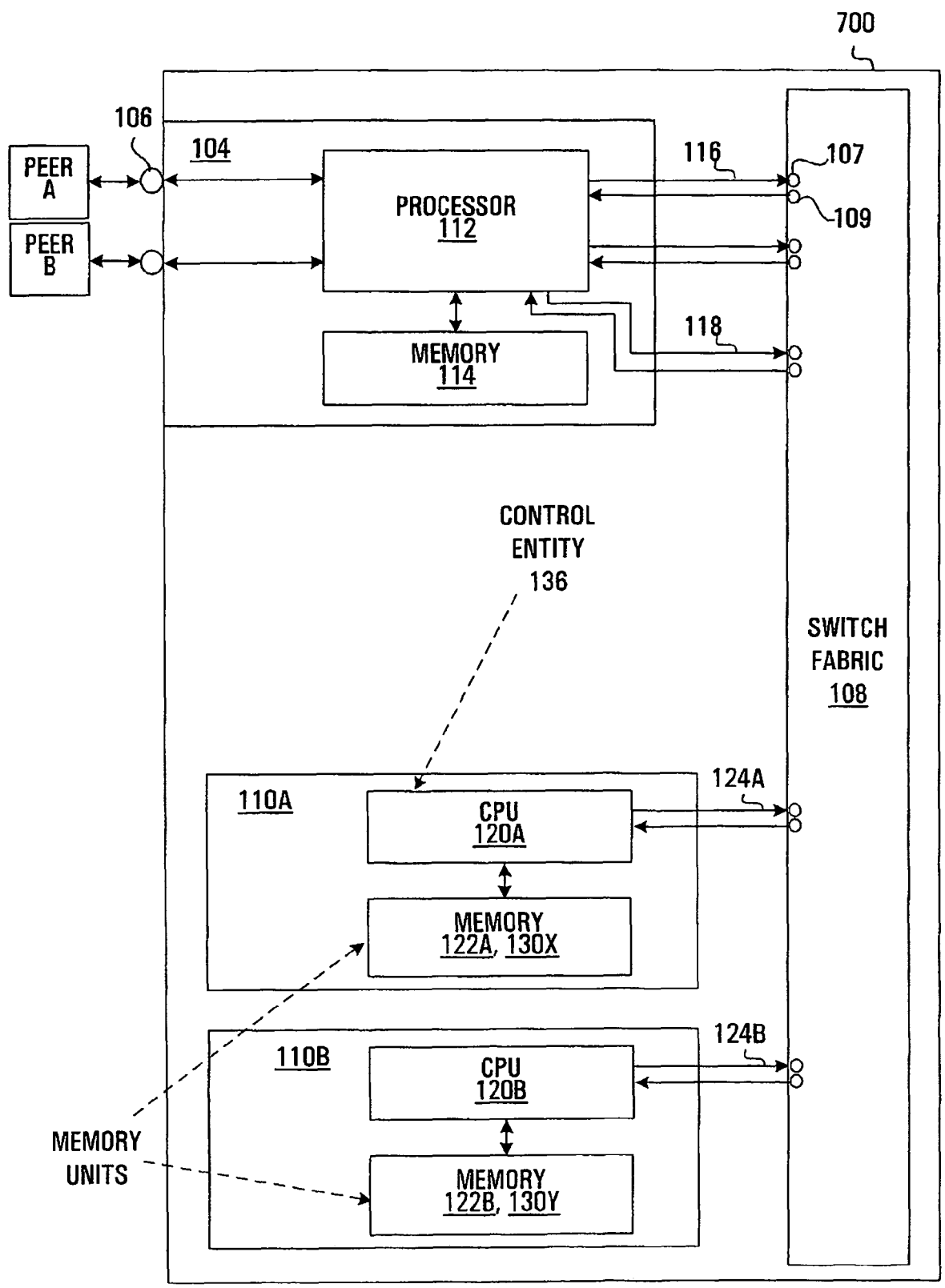

FIG. 7 shows a router 700 with two controller cards $110_X$, $110_Y$, each having a respective CPU $120_X$, $120_Y$ and a respective memory $122_X$, $122_Y$. In this case, memory unit $130_X$ is embodied as the memory $122_X$ on controller card $110_X$, while memory unit $130_Y$ is embodied as the memory $122_Y$ on controller card $110_Y$. The control entity 136 continues to run exclusively on the CPU $120_X$ of controller card $110_X$.

Thus, it will be appreciated by those skilled in the art that the embodiments described herein above help alleviate the memory problem associated with router scaling because information storage is distributed amongst multiple separately accessed memories.

Notwithstanding these memory savings, however, the use of a centralized control entity 136 for performing the RIB analysis and the FIB analysis, as well as the lookup function 200, may limit the ability of the control entity 136 to efficiently perform other processing tasks, such as advertising the RIB-OUTs to the neighbour nodes. In some cases, the embodiments described herein above may actually increase the computational load of the CPU $120_X$ implementing the control entity 136 if the lookup function 200 is performed in software. It would therefore be yet even more advantageous if the issue of computational complexity could be addressed at the same time as the memory storage issue.

To this end, it has been found that it is possible to break down the RIB analysis and the FIB analysis into a parallel processing problem by specially designing the lookup function 200 in such a way as to allow for a logical grouping of the routes amongst multiple memory units. In such an embodiment, multiple processors, such as the CPUs $122_X$, $122_Y$ in the controller cards $110_X$, $110_Y$, can participate concurrently in the RIB analysis and in the FIB analysis. As will also be shown, the lookup function 200 itself can be sped up by relying on a special class of hashing algorithms.

Figure 8:
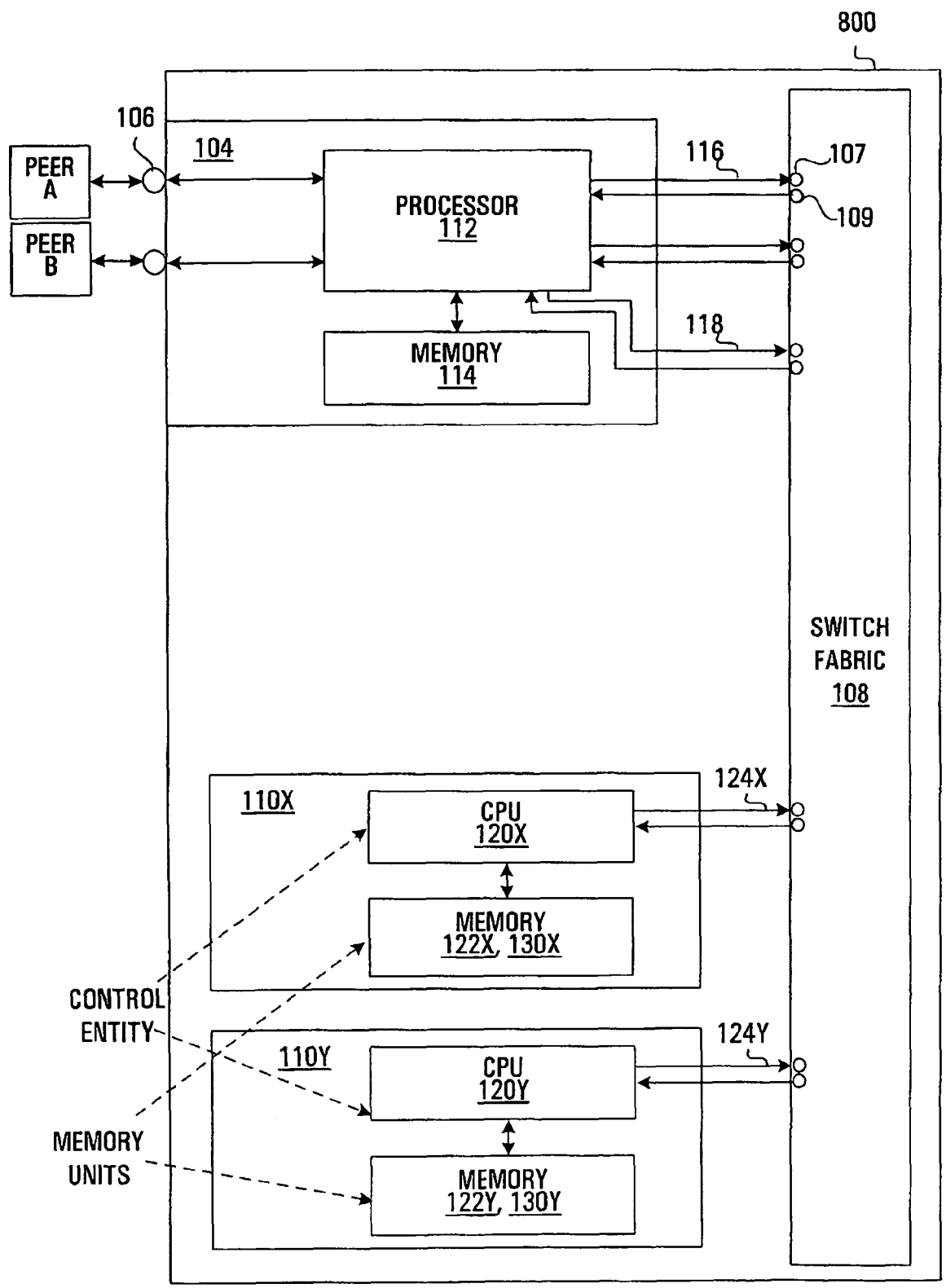

Accordingly, FIG. 8 shows a router 800 adapted from the router 700 of FIG. 7, wherein both CPUs $120_X$, $120_Y$ on both controller cards $110_X$, $110_Y$ are used to implement the control entity 136 in order to reduce the computational burden associated with the RIB analysis and the FIB analysis. Thus, the control entity 136 has two parts, one which resides with CPU $120_X$ on controller card $110_X$ and the other which resides with CPU $120_Y$ on controller card $110_Y$.

FIGS. 9A and 9B illustrate operation of the control entity in the router 800 of FIG. 8 in terms of distributing both routing information and computational load. It should be noted in FIGS. 9A and 9B that processing functions executed by the portion of the control entity 136 in processor $120_X$ are denoted by rectangles formed by a thin dashed contour, processing functions executed by the portion of the control entity 136 in processor $120_Y$ are denoted by rectangles formed by a thin dotted contour, memory usage within memory unit $130_X$ is denoted by rectangles formed by a thick dashed contour and memory usage within memory unit $130_Y$ is denoted by rectangles formed by a thick dotted contour. Of course, it should be understood that the use of a greater number of memory units is within the scope of the present invention.

In this case, both PEER A and PEER B each supply the same set of routes $G_1$, $G_2$, $G_3$, $G_4$, $G_5$, $G_6$, $S_1$, $S_2$, $S_3$, $S_4$, $S_5$, $S_6$, $S_7$ and $S_8$. However, since each route may be associated with an attribute (such as cost) that depends on the peer from which it was received, each route is subscripted according to the peer from which it originates. Of course, it is within the scope of the present invention to provide processing of distinct routes received from different ones of the peers. A likely scenario is that the various peers will supply some routes that overlap and others that are unique to that peer and such a scenario is also within the scope of what can be processed by a router in accordance with an embodiment of the present invention.

Moreover, the letter "G" that specifies a particular route serves to denote a route that is considered more general than specific, while the letter "S" serves to denote a route that is considered more specific than general. The definitions of "general" and "specific" depend on the traffic typically experienced by the router. Thus, routes considered to be "general" for a core router will tend to have prefixes that are shorter than routes considered to be "general" for an edge router. Of course, such a designation is artificial and merely serves to exemplify an embodiment of the present invention.

The set of routes received by the CPU $120_X$ from a given peer are temporarily stored in the memory $122_X$ in a corresponding input routing information base (RIB-IN). The RIB-IN for PEER A is denoted RIB-IN$_A$ and the RIB-IN for PEER B is denoted RIB-IN$_B$. Thus, routes $G_{1,A}$, $G_{2,A}$, $G_{3,A}$, $G_{4,A}$, $G_{5,A}$, $G_{6,A}$, $S_{1,A}$, $S_{2,A}$, $S_{3,A}$, $S_{4,A}$, $S_{5,A}$, $S_{6,A}$, $S_{7,A}$ and $S_{8,A}$ are stored in RIB-IN$_A$ and routes $G_{1,B}$, $G_{2,B}$, $G_{3,B}$, $G_{4,B}$, $G_{5,B}$, $G_{6,B}$, $S_{1,B}$, $S_{2,B}$, $S_{3,B}$, $S_{4,B}$, $S_{5,B}$, $S_{6,B}$, $S_{7,B}$ and $S_{8,B}$ are stored in RIB-IN$_B$.

Next, the portion of the control entity 136 running on the CPU 120$_X$ executes a lookup function 200 to determine in which one(s) of the memory units 130$_X$, 130$_Y$ to store each individual route in each RIB-IN. The lookup function 200 separates the routes in the set of routes into two or more subsets of routes, one for each of the two memory units 130$_X$, 130$_Y$. In the illustrated embodiment, a route can be stored in memory unit 130$_X$ or memory unit 130$_Y$ or both. In embodiments where there is a greater number of memory units available for participating in the storage of routes, a route may be stored in any number of the available memory units.

The exact distribution of the routes is controllable by selecting an appropriate lookup function 200, which can suitably be adapted to produce results dependent upon a property of the routes. In this embodiment, the control entity 136 is called upon to establish a logical grouping of the routes; for instance, it is within the scope of the invention for a route to be sent to one memory unit or both memory units on the basis of the specificity of the route. If the route is to be sent to a single memory unit, then the identity of that memory unit will depend on the precise value of the specific route.

The grouping of routes according to their specificity provides a particular advantage in that it allows certain operations, notably a substantial portion of the generation of the output routing information bases, to be performed in parallel, thereby alleviating the computational burden associated with maintaining up-to-date routing information within the router 100A.

Again, it should be appreciated that myriad ways of performing the lookup function 200 are within the scope of the present invention. For example, the lookup function 200 may be performed in hardware by way of a hard-coded lookup table or by executing a hashing function (this method is described in greater detail later on). This provides a fast and direct way of obtaining the identity of one or more memory units into which the route is to be stored. On the other hand, a slower yet more flexible approach involves consulting a lookup table in software. In still other cases, hashing may be performed on a general part of the prefix and a lookup table may be used for very specific prefixes.

Upon running the lookup function 200 on each set of routes received form each peer, it will eventually be the case that the memory unit 130$_X$ will contain a certain subset of each set of routes for each peer and memory unit 130$_Y$ will contain a different subset of each set of routes for each peer. Because of the fact that the lookup function 200 operates on the basis of route specificity, the more general routes will overlap, while the more specific routes will remain uniquely associated with either one or the other of the memory units 130$_X$, 130$_Y$.

In the illustrated example embodiment, memory unit 130$_X$ contains all the general routes $G_{1,A}$-$G_{6,A}$, $G_{1,B}$-$G_{6,B}$ received from each of the peers, as well as routes $S_{1,A}$, $S_{3,A}$, $S_{5,A}$, $S_{7,A}$ from PEER A and $S_{1,B}$, $S_{3,B}$, $S_{5,B}$, $S_{7,B}$ from PEER B. Similarly, memory unit 130$_Y$ also holds all the general routes $G_{1,A}$-$G_{6,A}$, $G_{1,B}$-$G_{6,B}$ received from each of the peers, as well as routes $S_{2,A}$, $S_{4,A}$, $S_{6,A}$, $S_{8,A}$ from PEER A and $S_{2,B}$, $S_{4,B}$, $S_{6,B}$, $S_{8,B}$ from PEER B.

As previously described with reference to FIG. 2, because the router 100A can learn about the same route through multiple neighbour nodes, the control entity 136 needs to initiate a RIB analysis to determine what routing information it will advertise to its peers and a FIB analysis to determine what the effect of the routing information is on the forwarding information base. In accordance with this embodiment of the present invention, the responsibility for performing either or both of the RIB analysis and the FIB analysis is distributed amongst the CPUs 120$_X$, 120$_Y$.

Specifically, the portion of the control entity 136 on CPU 120$_X$ runs a RIB analysis on the routes stored in memory unit 130$_X$ in order to partly decide on reachability information to advertise to PEER A and PEER B. It is possible that different reachability information will need to be advertised to each of the peers, depending on such considerations as policy and cost. This results in the creation of two partial output routing information bases denoted RIB-OUT$_{partial,A,X}$ (to indicate the partial RIB-OUT generated by the portion of the control entity 136 running on CPU 120$_X$, for PEER A) and RIB-OUT$_{partialB,X}$ (to indicate the partial RIB-OUT generated by the portion of the control entity 136 running on CPU 120$_X$, for PEER B).

Meanwhile, the portion of the control entity 136 on CPU 122$_Y$ runs a RIB analysis on the routes stored in memory unit 130$_Y$ in order to partly decide on reachability information to advertise to PEER A and PEER B. This results in the creation of two partial output routing information bases denoted RIB-OUT$_{partial,A,Y}$ (to indicate the partial RIB-OUT generated by the portion of the control entity 136 running on CPU 120$_Y$, for PEER A) and RIB-OUT$_{partialB,Y}$ (to indicate the partial RIB-OUT generated by the portion of the control entity 136 running on CPU 120$_y$, for PEER B).

The partial output routing information bases then can be processed by the portion of the control entity on CPU 122$_X$ to generate a set of routing information bases (RIB-OUTs) to be advertised to the peers.

Those skilled in the art will appreciate that similar parallel processing can occur insofar as the FIB analysis is concerned. Thus, the portion of the control entity 136 on CPU 122$_Y$ runs a FIB analysis on the routes stored in memory unit 130$_X$ in order to create a partial forwarding information base denoted FIB-OUT$_{partial,X}$, indicative of the partial FIB generated by the portion of the control entity 136 running on CPU 120$_X$.

Meanwhile, the portion of the control entity 136 on CPU 122$_Y$ runs a FIB analysis on the routes stored in memory unit 130$_Y$ in order create a partial forwarding information base denoted FIB-OUT$_{partial,Y}$, indicative of the partial FIB generated by the portion of the control entity 136 running on CPU 120$_Y$.

The fact that the RIB analysis and/or the FIB analysis can take place in parallel on multiple CPUs reduces the load of CPU 122$_X$ which is maintaining sessions with the peers. Therefore, not only does this embodiment of the present invention afford a memory savings, but it also alleviates the computational load associated with the generation of routing and forwarding information.

In the above embodiment, since it is the CPU 122$_X$ which runs BGP4 sessions with all peers, it is the same CPU 122$_X$ which runs the portion of the control entity 136 which is responsible for the lookup function 200 and for generation of a RIB-OUT for each peer from the various corresponding partial RIB-OUTs.

In other embodiments, such as that shown in FIG. 9B, multiple CPUs may be involved in communication with the peers. In the illustrated embodiment, CPU 122$_X$ is involved in maintaining a BGP4 session with PEER A and CPU 122$_Y$ is involved in maintaining a BGP4 session with PEER B. In this case, the responsibilities for the lookup function 200 are executed by both CPUs as are the responsibilities for consolidating the partial RIB-INs.

Figure 10A:
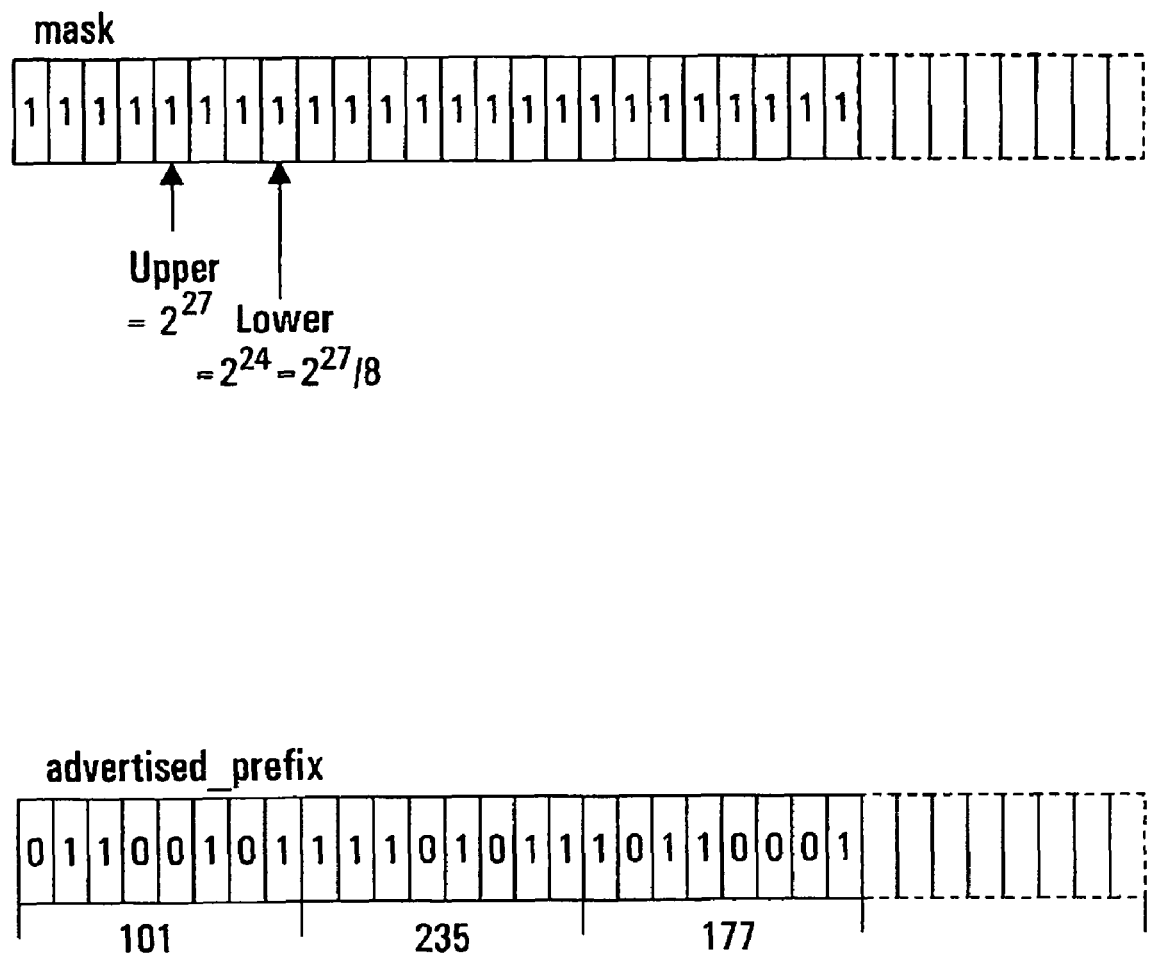
FIG. 10A is a conceptual diagram showing an example instance of an advertised prefix and a mask associated with a neighbour node.
Figure 10B:
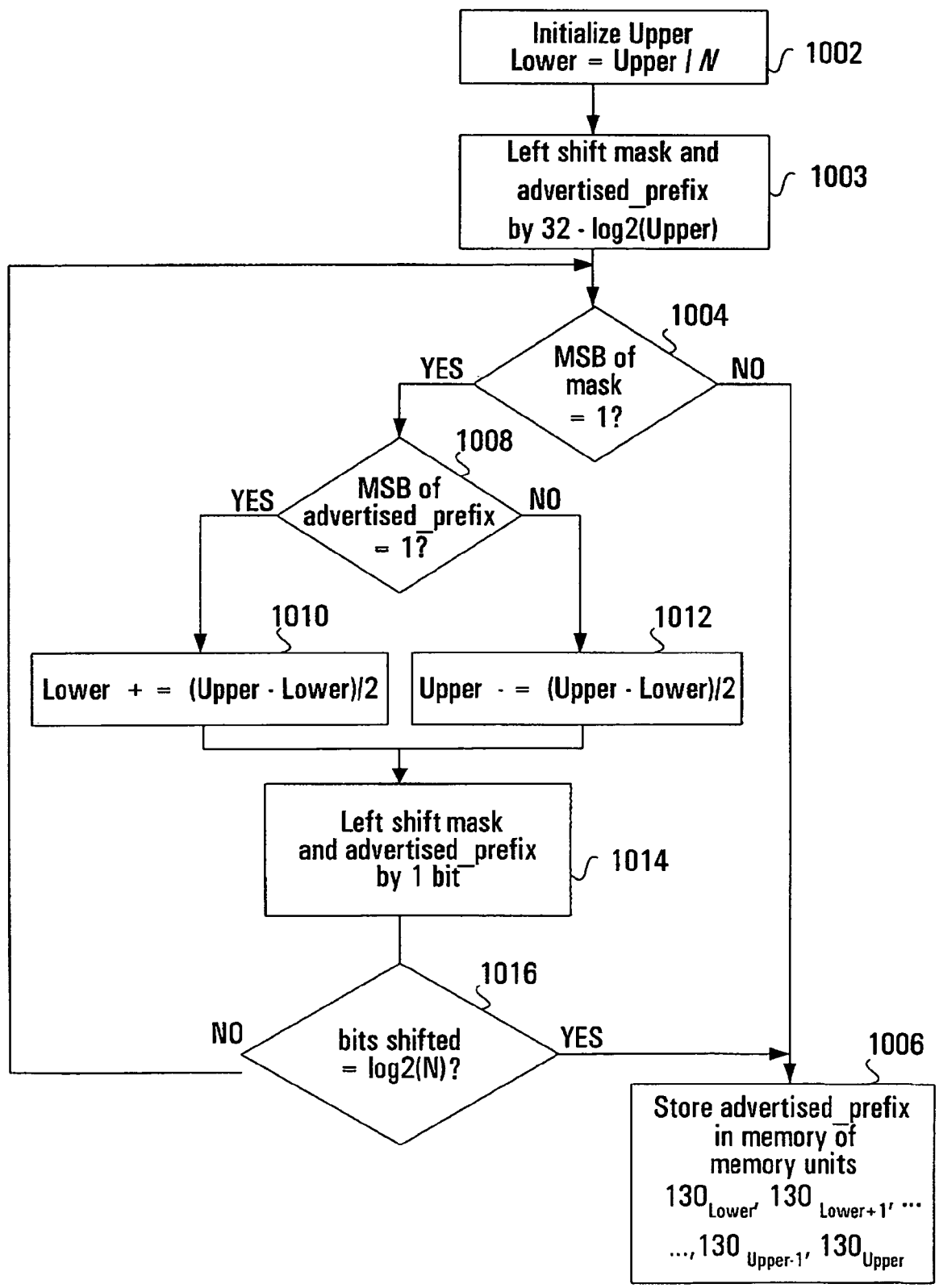
FIG. 10B is a flowchart illustrating the operational steps in a hashing algorithm used to determine where to store information associated with a particular advertised prefix.

One example of a lookup function 200 which allows a suitable logical grouping of the address space to be realized is now described with reference to FIGS. 10A and 10B. The particular lookup function 200 to be described can be referred to as a hashing algorithm because it considers the individual bits of an advertised prefix associated with a received route. Specifically, the hashing algorithm operates on prefixes that are advertised by the neighbour nodes (peers) in order to determine on which of a plurality of memory units to store each prefix. As is known in the art of classless inter-domain routing, the length of the prefix might not be a multiple of 8 bits and thus a bit-mask is provided for identifying the true value of a prefix within a multi-octet word. The hashing algorithm relies on this mask as well as on the advertised prefix itself in deciding on which controller card to store the advertised prefix.

For the purposes of this discussion, it will be assumed that there are up to N memory units that are available for storing prefixes and these will be denoted using numeric subscripts $130_1, 130_2, \ldots, 130_N$ for ease of illustration. It is further assumed for the purposes of this specific example that N is a power of two, although this is not required generally. With specific reference to FIG. 10B, a specific instance of a suitable hashing algorithm begins with an initialization at step 1002 which determines the initial values of two variables, namely "Lower" and "Upper". As will be described herein below, Lower and Upper represent bit positions and relate to the expected specificity of the routes received from the peers.

The final values of Lower and Upper determine the range of memory units that will be used for storing the advertised prefix. If Upper is equal to Lower after the hash, then the advertised prefix will be stored in only one memory unit, namely $130_{Lower}$ (or $130_{Upper}$, which is the same as $130_{Lower}$). If, on the other hand, Upper is greater than Lower after the hash, then the advertised prefix will be stored on all controller cards between $130_{Lower}$ and $130_{Upper}$, inclusively.

In this specific embodiment, assuming a 32-bit addressing system, the initial value of Upper is selected as a power of two, within the range from 2 to $2^{31}$, as a function of the expected specificity of received prefixes, which depends on traffic patterns in the network and on the location of the given router in the network. By way of example, it may be advantageous to set the initial value of Upper to $2^{28}$ for a core router, whereas for an edge router, it may be advantageous to set the initial value of Upper to $2^{16}$. This is because the prefixes advertised to a core router are expected to be less specific than the prefixes advertised to an edge router.

The initial value for Upper is not limited to these two example values. In the absence of a reasoned selection of the initial value of Upper for a given router, a default value for Upper may be used, such as $2^{24}$, for example. Once the bit position (and hence the value) of Upper is selected, the value of Lower is chosen, such as Upper/N when N is a power of two. In some circumstances, it may be advantageous to first select Lower and then to make Upper equal to the product of Lower and N.

At step 1003, both the mask and the advertised prefix are shifted by 32 minus the bit position of Upper. In other words, any route specificity which is due to a shorter mask than $32-\log_2(\text{Upper})$ is discarded. At step 1004, the hashing algorithm enters a loop, which first queries whether the most significant bit of the (shifted) mask is set to 1. In most cases, a first pass through the hashing algorithm will reveal that the most significant bit (MSB) of the mask is indeed set, which will cause the hashing algorithm to execute step 1008. However, if not, then the hashing algorithm exits the loop and proceeds to step 1006, which causes the advertised prefix to be stored on all memory units $130(i)$ for which Lower$\leq$i$\leq$Upper.

At step 1008, it is verified whether the most significant bit of the advertised prefix is set. This may or may not be the case, depending on the prefix itself. In one of the two cases, the value of Lower is increased and in the other case, the value of Upper is decreased. In the example flowchart shown in FIG. 10B, the value of Lower is increased by one-half the value of the difference between Upper and Lower (at step 1010) if the most significant bit of the advertised prefix is set; otherwise, the value of Upper is decreased by one-half the difference between Upper and Lower (at step 1012). Following either step 1010 or step 1012, both the mask and the advertised prefix are shifted left by one bit at step 1014.

At step 1016, it is verified whether the number of left shifts since entering the loop at step 1004 has exceeded $\log_2(N)$, the number of bits required to represent the number of available memory units. If the number of such left shifts is less than $\log_2(N)$, the hashing algorithm returns to the beginning of the loop at step 1004. However, if the number of left shifts has exceeded $\log_2(N)$, then the hashing algorithm proceeds to step 1006, which causes the advertised prefix to be stored on all memory units $130(i)$) for which i falls between the current values of Lower and Upper, inclusively.

In accordance with the hashing algorithm, therefore, longer prefixes (i.e., more specific/less general routes) will be stored in fewer locations while shorter prefixes (i.e., less specific/more general routes) will be stored in a greater number of locations. Thus, the hashing algorithm provides some duplicate storage of prefixes within the router. However, the memory requirement per controller card remains on the order of 1/N of the total memory requirement for the router, which grows approximately linearly with the number of interfaces. Thus, it is possible to accommodate the growth in the memory requirement of the router by increasing the number of available memory units, thereby achieving a high degree of scalability.

It should be understood that lookup functions 200 other than the hashing algorithm described herein above exist which also achieve a logical grouping of the address space so as to permit parallel RIB analysis and/or FIB analysis to take place. For instance, those skilled in the art may be aware of lookup functions 200 that operate on the basis of the bit pattern, density, value, length, etc. of a prefix and which allow partial RIB-OUTs or partial FIBs to be generated without centralized intervention.

Those skilled in art should appreciate that the present invention is applicable to protocols other than BGP4 and to routing information that differs from that usually exchanged in the context of BGP4. For example, it is envisaged that in the case of the open shortest path first (OSPF) protocol, storage of the OSPF link state advertisement (LSA) linked list and the OSPF candidate table may be distributed across multiple memory units, either in the line cards 104 or the controller cards $110_X$, $110_Y$ or both. Furthermore, multiple protocols may run simultaneously and the memory storage requirements for each protocol may be similarly distributed.

Moreover, in other embodiments of the present invention, it may be advantageous to purposely duplicate the storage of routing information in order to increase robustness. For example, a lookup function 200, which operates on a prefix and which knows of a group of N available memory units and a group of M spare memory units, may be designed in such a way as to identify anywhere from 2 to N+M of the memory units for storage of a particular prefix (depending on its specificity, length, value, bit pattern, etc.) This added protection feature would allow a routing protocol to continue to operate undisturbed even if one of the memory units fails, since a duplicate version of the corresponding partial RIB-OUTs and partial FIB exist elsewhere.

Those skilled in the art should further appreciate that it may be advantageous for the control entity 136 to know which memory units will be used for the storage of routing information and which will not. The memory units that are to be used for storage of routing information are hereinafter referred to as "available" memory units, and those which are not to be used for storage of routing information are hereinafter referred to as "unavailable" memory units.

To achieve the desired functionality, it is within the scope of the present invention for the control entity to perform a setup operation, during which occurs detection of the identity of those memory units $130_X$, $130_Y$ that are available for participating in distributed storage of routing information. If the memory units $130_X$, $130_Y$ are stored amongst the line cards 104, this can be achieved by configuring the line cards 104 to communicate an availability message to the control entity. Such a message could be sent by a line card 104 upon connection of the line card 104 or could be sent periodically in order to allow the control entity 136 to detect when the line card 104 fails or has been disconnected.

In order to achieve an equitable distribution of memory storage responsibilities, the lookup function 200 could be modified to respond to changes in the number and identity of the available memory units. For example, when a new memory unit becomes available, the lookup function 200 may adapt so that the routes are more evenly distributed. This may be done in one embodiment by splitting the responsibilities of memory unit associated with the largest number of routes such that storage of some of its routes is now the responsibility of the new memory unit.

In this way, it is possible to achieve an equitable distribution of memory requirements amongst available resources. Moreover, this feature allows the router 100 to be scaled dynamically to large numbers of interfaces 106. Specifically, if the memory units 130 are embodied as the memories 114 in the line cards 104 and if the number of line cards 104 (and ports 106) doubles, then the available storage space will also double. Since the volume of routing information increases with the number of ports, the added storage space triggers a redistribution of the storage responsibilities and allows the memory requirement for any single line card to remain approximately constant.

The resulting distribution of storage responsibilities may be such that each available memory is equally used or approximately equally used. On the other hand, this may not always be possible or desirable (e.g., when using memory units of varying capacities) and thus it is within the scope of the invention to allow wide variations in the amount of routing information stored amongst the various available memory units.

Another advantage in detecting the number of available memory units is apparent when considering the scenario in which one of the memory units fails (e.g., upon failure or disconnection of a line card). According to an embodiment of the present invention, the remaining memory units take over the storage responsibilities under control of control entity 136. Specifically, when a particular memory unit becomes unavailable, the lookup function 200 may change so that the routes are more evenly distributed. This may be done in one embodiment by combining the former responsibilities of now-unavailable memory unit with those of the memory unit responsible for storing the least number of routes. Modification of the lookup function 200 in response to changes in the number or identity of available memory units is advantageously achieved when the lookup function 200 is implemented in software.

It should further be appreciated that in some embodiments of the invention, all or part of the functionality previously described herein with respect to the processing units in the controller cards may be implemented as pre-programmed hardware or firmware elements (e.g., application specific integrated circuits (ASICs), electrically erasable programmable read-only memories (EEPROMs), etc.), or other related components. In particular, it may be advantageous from a cost or complexity perspective to use a hardware element for performing, or assisting in the performance of, the hashing algorithm.

In other embodiments of the invention, all or part of the functionality previously described herein with respect to the lookup function 200 may be implemented as software consisting of a series of instructions for execution by a computer system. The series of instructions could be stored on a medium which is fixed, tangible and readable directly by the computer system, (e.g., removable diskette, CD-ROM, ROM, or fixed disk), or the instructions could be stored remotely but transmittable to the computer system via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should further appreciate that the series of instructions may be written in a number of programming languages for use with many computer architectures or operating systems. For example, some embodiments may be implemented in a procedural programming language (e.g., "C") or an object oriented programming language (e.g., "C++" or "JAVA").

While specific embodiments of the present invention have been described and illustrated, it will be apparent to those skilled in the art that numerous modifications and variations can be made without departing from the scope of the invention as defined in the appended claims.

The invention claimed is:

1. A method of processing a plurality of sets of routing information received from corresponding ones of a plurality of neighbor nodes connectable to a router, the router having a plurality of memory units accessible via separate paths, the method comprising:

said router creating a respective plurality of non-identical routing information subsets from each of at least one of the received sets of routing information;

said router accessing the plurality of memory units via the separate paths; and said router storing the plurality of non-identical routing information subsets created from a given one of said received sets of routing information in respective ones of the plurality of memory units, wherein said at least one of the received sets of routing information is a plurality of the received sets of routing information, and wherein at least one of the plurality of non-identical routing information subsets created from the given one of said received sets of routing information comprises a portion that is not present in any of the other ones of the non-identical routing information subsets created from the given one of said received sets of routing information.

2. A method of processing a plurality of sets of routing information received from corresponding ones of a plurality of neighbor nodes connectable to a router, the router having a plurality of memory units accessible via separate paths, the method comprising:

said router creating a respective plurality of non-identical routing information subsets from each of at least one of the received sets of routing information;

said router accessing the plurality of memory units via the separate paths; and said router storing the plurality of non-identical routing information subsets created from a given one of said received sets of routing information in respective ones of the plurality of memory units, wherein said at least one of the received sets of routing information is a plurality of the received sets of routing information, and wherein each of the received sets of routing information includes a respective set of routes and wherein said creating a respective plurality of non-identical routing information subsets from each of at least one of the received sets of routing information includes creating a respective plurality of non-identical subsets of routes from the set of routes in each of the at least one of the received sets of routing information, further comprising: for each of the memory units, creating a forwarding sub-table associated with said memory unit from all routing information subsets stored in said memory unit further comprising: creating a complete forwarding table from the forwarding sub-tables stored in the plurality of memory units wherein no given memory unit of said plurality of memory units contains all routes from which said complete forwarding table is built.

3. A method as claimed in claim 2, wherein each route has a specificity, and wherein each plurality of non-identical subsets of routes is created on the basis of the specificity of each route in the set of routes in a respective one of the received sets of routing information.

4. A method of processing a plurality of sets of routing information received from corresponding ones of a plurality of neighbor nodes connectable to a router, the router having a plurality of memory units accessible via separate paths, the method comprising:

said router creating a respective plurality of non-identical routing information subsets from each of at least one of the received sets of routing information;

said router accessing the plurality of memory units via the separate paths; and said router storing the plurality of non-identical routing information subsets created from a given one of said received sets of routing information in respective ones of the plurality of memory units, wherein said at least one of the received sets of routing information is a plurality of the received sets of routing information, and further comprising: for each of the memory units and for each of the neighbor nodes, creating a partial output routing information base, associated with said memory unit and said neighbor node, from all routing information subsets stored in said memory unit.

5. A method as claimed in claim 4, further comprising: for each neighbor node, creating a complete output routing information base, associated with said neighbor node, from all partial output routing information bases associated with said neighbor node.

6. A method as claimed in claim 5, further comprising: advertising to at least one neighbor node other than said neighbor node the complete output routing information base associated with said neighbor node.

7. A method of processing a plurality of sets of routing information received from corresponding ones of a plurality of neighbor nodes connectable to a router, the router having a plurality of memory units accessible via separate paths, the method comprising:

said router creating a respective plurality of non-identical routing information subsets from each of at least one of the received sets of routing information;

said router accessing the plurality of memory units via the separate paths; and said router storing the plurality of non-identical routing information subsets created from a given one of said received sets of routing information in respective ones of the plurality of memory units, wherein said at least one of the received sets of routing information is a plurality of the received sets of routing information, and wherein each of the received sets of routing information includes a respective set of prefixes and associated attributes and wherein creating a respective plurality of non-identical routing information subsets from each of at least one of the received sets of routing information includes creating a respective plurality of non-identical subsets of prefixes and associated attributes from the set of prefixes and associated attributes in each of at least one of the received sets of routing information.

8. A method of processing a plurality of sets of routing information received from corresponding ones of a plurality of neighbor nodes connectable to a router, the router having a plurality of memory units accessible via separate paths, the method comprising:

said router creating a respective plurality of non-identical routing information subsets from each of at least one of the received sets of routing information;

said router accessing the plurality of memory units via the separate paths; and said router storing the plurality of non-identical routing information subsets created from a given one of said received sets of routing information in respective ones of the plurality of memory units, wherein said at least one of the received sets of routing information is a plurality of the received sets of routing information, and further comprising: identifying a set of at least two available memory units among the plurality of memory units; wherein creating a respective plurality of non-identical routing information subsets from each of at least one of the received sets of routing information includes creating as many non-identical routing information subsets from a certain one of said received sets of routing information as there are memory units in said set of available memory units.

9. A method as claimed in claim 8, further comprising: identifying a new set of at least two available memory units among the plurality of memory units; creating as many non-identical routing information subsets from a particular one of said received sets of routing information as there are memory units in said new set of available memory units.

10. A method as claimed in claim 8, further comprising: identifying a change in the number of memory units in said set of at least two available memory units; and modifying the number of non-identical routing information subsets created from a given one of said received sets of routing information to match the changed number of available memory units.

11. A method as claimed in claim 8, wherein: said at least one of the received sets of routing information is a plurality of the received sets of routing information; for each given received set of routing information in said plurality of the received sets of routing information, the same function is used to create the respective plurality of non-identical routing information subsets from said given received set of routing information; each of the received sets of routing information includes a respective set of prefixes and associated attributes; creating a respective plurality of non-identical routing information subsets from each of at least one of the received sets of routing information includes creating a respective plurality of non-identical subsets of prefixes and associated attributes from the set of prefixes and associated attributes in each of at least one of the received sets of routing information; and for each received set of routing information in said plurality of the received sets of routing information, the subsets containing any given prefix are stored in the same memory units as the corresponding subsets of the other received sets of routing information from said plurality of the received sets of routing information that contain the same given prefix.

12. A method as claimed in claim 11, further comprising: identifying a change in the number of memory units in said set of at least two available memory units; modifying the number of non-identical routing information subsets created from a given one of said received sets of routing information to match the changed number of available memory units;

wherein each non-identical routing information subset has a respective number of routes and wherein said modifying the number of non-identical routing information subsets comprises:

responsive to a decrease in said number of available memory units, combining the corresponding subsets of the two or more memory units that have the smallest numbers of routes.

13. A method as claimed in claim 11, further comprising: identifying a change in the number of memory units in said set of at least two available memory units; modifying the number of non-identical routing information subsets created from a given one of said received sets of routing information to match the changed number of available memory units;

wherein each non-identical routing information subset has a respective number of routes and wherein said modifying the number of non-identical routing information subsets comprises:

responsive to an increase in said number of available memory units, splitting the subsets associated with the one or more memory units that have the largest numbers of routes.

14. A method of distributing routing information among a plurality of memory units, the routing information pertaining to a plurality of routes, each of the routes having a prefix with a respective length, the method comprising: a router associating each of said routes with a respective subset of said plurality of memory units on a basis of the prefix of that route, the number of memory units in the subset of said plurality of memory units that is associated with a given one of said routes being inversely related to the length of that route's prefix; and causing the routing information pertaining to each of said routes to be stored in each of the at least one of the memory units associated with that route; wherein the routing information pertaining to at least one of said routes is not stored in all of said plurality of memory units.

* * * * *